(12) United States Patent
Nakamura

(10) Patent No.: US 8,712,683 B2
(45) Date of Patent: Apr. 29, 2014

(54) SENSOR CONTROLLER, NAVIGATION DEVICE, AND SENSOR CONTROL METHOD

(75) Inventor: Junya Nakamura, Kanagawa (JP)

(73) Assignee: Clarion Co., Ltd., Tokyo (JP)

( * ) Notice: Subject to any disclaimer, the term of this patent is extended or adjusted under 35 U.S.C. 154(b) by 133 days.

(21) Appl. No.: 13/497,630

(22) PCT Filed: Sep. 21, 2010

(86) PCT No.: PCT/JP2010/066328
§ 371 (c)(1),
(2), (4) Date: Mar. 22, 2012

(87) PCT Pub. No.: WO2011/037109
PCT Pub. Date: Mar. 31, 2011

(65) Prior Publication Data
US 2012/0221207 A1 Aug. 30, 2012

(30) Foreign Application Priority Data
Sep. 25, 2009 (JP) ................. 2009-221074

(51) Int. Cl.
*G08G 1/123* (2006.01)
*G08G 1/01* (2006.01)
*G08G 1/04* (2006.01)
*G08G 1/16* (2006.01)
*G08G 1/0967* (2006.01)
*G01C 21/36* (2006.01)
*G06K 9/00* (2006.01)

(52) U.S. Cl.
CPC ................ G08G 1/0104 (2013.01); *G08G 1/04* (2013.01); *G08G 1/167* (2013.01); *G08G 1/09675* (2013.01); *G01C 21/3691* (2013.01); *G06K 9/00791* (2013.01)
USPC ............................ 701/423; 701/439; 701/540

(58) Field of Classification Search
CPC ... G06F 13/14; G06F 17/00; G06F 17/30386; H04W 4/008; H04W 4/027; G08G 1/0104; G08G 1/04; G08G 1/167; G08G 1/09675; G01C 21/3691; G06K 9/00798; G06K 9/00791
USPC .................. 701/408–410, 423, 431, 439, 540
See application file for complete search history.

(56) References Cited

U.S. PATENT DOCUMENTS

| 6,125,326 | A | * | 9/2000 | Ohmura et al. | ................ 701/454 |
|---|---|---|---|---|---|
| 6,314,369 | B1 | * | 11/2001 | Ito et al. | ......................... 701/421 |
| 7,054,467 | B1 | * | 5/2006 | Honda | .......................... 382/104 |
| 7,962,280 | B2 | * | 6/2011 | Kindo et al. | .................... 701/439 |
| 8,239,131 | B2 | * | 8/2012 | Kindo et al. | .................... 701/436 |
| 2005/0174429 | A1 | | 8/2005 | Yanai | |
| 2005/0240342 | A1 | | 10/2005 | Ishihara et al. | |
| 2006/0125919 | A1 | | 6/2006 | Camilleri et al. | |
| 2006/0176160 | A1 | | 8/2006 | Zoratti et al. | |
| 2006/0271278 | A1 | * | 11/2006 | Sakakibara et al. | .......... 701/207 |
| 2008/0007428 | A1 | | 1/2008 | Watanabe et al. | |

FOREIGN PATENT DOCUMENTS

| GB | 2 422 499 A | 7/2006 |
|---|---|---|
| JP | 2002-109696 | 4/2002 |
| JP | 2005-223524 | 8/2005 |
| JP | 2005-309812 | 11/2005 |
| JP | 2008-174023 | 7/2008 |
| JP | 2009-037457 | 2/2009 |
| JP | 2009-092929 | 4/2009 |
| WO | WO 2006/006689 A1 | 1/2006 |

OTHER PUBLICATIONS

Ehlgen et al, Eliminating Blind Spots for Assisted Driving, IEEE Transactions on Intelligent Transportation Systems, 2008, pp. 657-665.*
Supplementary European Search Report dated Nov. 20, 2012 from corresponding European Patent Application EP 10 81 8782.4.

* cited by examiner

*Primary Examiner* — Russell Frejd
(74) *Attorney, Agent, or Firm* — Scully, Scott, Murphy & Presser, PC

(57) ABSTRACT

Conventional navigation devices are equipped with technology that supports the driving of a driver by detecting the surroundings of a vehicle using a plurality of sensors such as cameras. However, because complex arithmetic processing is carried out using the detection results from the plurality of sensors, the processing load increases and other processes requiring a rapid response can be delayed. As a result, consideration has been given to decreasing the amount of arithmetic processing and reducing the processing load by uniformly decreasing the processing area for information detected by the sensors. However, if the processing area is uniformly decreased, information necessary for driving support may not be obtained. Provided is a sensor control technology that better obtains information necessary for driving support: a sensor controller, characterized by carrying out predetermined processing by changing the processing area of the information acquired by the sensors according to the vehicle driving conditions.

20 Claims, 20 Drawing Sheets

LINK TABLE 150

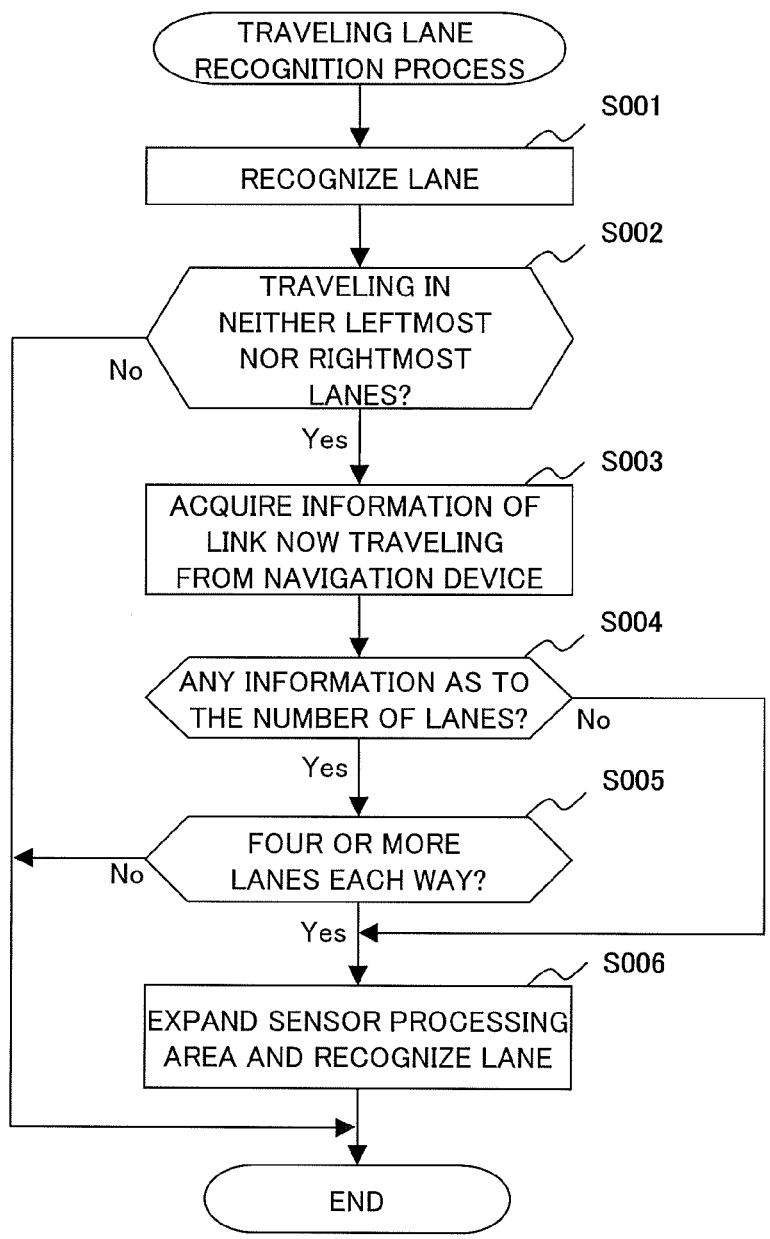

006666
SENSOR CONTROLLER, NAVIGATION DEVICE, AND SENSOR CONTROL METHOD

CROSS-REFERENCE TO RELATED APPLICATIONS

This application claims priority to PCT Application JP/2010/066328 filed on Sep. 21, 2010, which claims priority to Application No. JP 2009-221074 filed on Sep. 25, 2009, the contents of each of which are incorporated herein by reference.

TECHNICAL FIELD

The present invention relates to a sensor control technique. This application claims priority to Japanese Patent Application No. 2009-221074 filed on Sep. 25, 2009, and in the designated countries where incorporation of documents by reference is approved, the entire contents of the aforementioned patent application are incorporated into the present patent application by reference.

BACKGROUND ART

Conventionally, a navigation device includes a technique which controls multiple sensors such as a camera to detect information around a vehicle, and uses the information to support driving. The Patent Document 1 describes a technique of this kind of navigation device.

PRIOR ART DOCUMENT

Patent Document

Patent Document 1: Japanese Unexamined Patent Application Publication No. 2009-37457

DISCLOSURE OF THE INVENTION

Problem to be Solved by the Invention

The navigation device as described above carries out a complicated arithmetic processing by the use of results being detected by the multiple sensors. Therefore, this may increase a processing load, causing a delay in other processing which requires a quick reaction, for instance, providing guidance such as a right turn or a left turn at an intersection. In order to solve this problem, it is conceived that a processing area is reduced with regard to the information detected by the sensors, so as to lower an amount of the computational throughput, thereby decreasing the processing load. However, if the processing area is constantly reduced, information necessary for the driving support may not be obtained.

An object of the present invention is to provide a sensor control technique which allows acquisition of information necessary for the driving support more appropriately.

Means to Solve the Problem

In order to solve the problem above, a sensor controller relating to the present invention is connected to multiple sensor unit adapted to detect information around a vehicle, including a traveling state grasping unit adapted to grasp a traveling state of the vehicle, a processing unit adapted to perform a certain process on a predetermined area, within the information around the vehicle detected by the sensor unit, and a processing portion changing unit adapted to change the predetermined area to be processed by the processing unit, according to the traveling state grasped by the traveling state grasping unit.

Furthermore, a navigation device of the present invention is connected to multiple sensor unit adapted to detect information around a vehicle, including a traveling state grasping unit adapted to grasp a traveling state of the vehicle, a processing unit adapted to perform a certain process on a predetermined area, within the information around the vehicle detected by the sensor unit, and a processing portion changing unit adapted to change the predetermined area to be processed by the processing unit, according to the traveling state grasped by the traveling state grasping unit.

Furthermore, a sensor control method of the present invention is a method according to a sensor controller connected to multiple sensor unit adapted to detect information around the vehicle, the sensor controller being provided with a processing unit adapted to perform a certain process on a predetermined area, within the information around the vehicle detected by the sensor unit, the sensor control method executing a traveling state grasping step for grasping the traveling state of the vehicle, and a processing portion changing step for changing the predetermined area, according to the traveling state grasped by the traveling state grasping step.

BRIEF DESCRIPTION OF DRAWINGS

FIG. 10 is a flow diagram showing a traveling lane recognition process;

PREFERRED EMBODIMENT FOR CARRYING OUT THE INVENTION

Hereinafter, the sensor control system to which one embodiment of the present invention is applied will be explained, with reference to the accompanying drawings.

Figure 1:
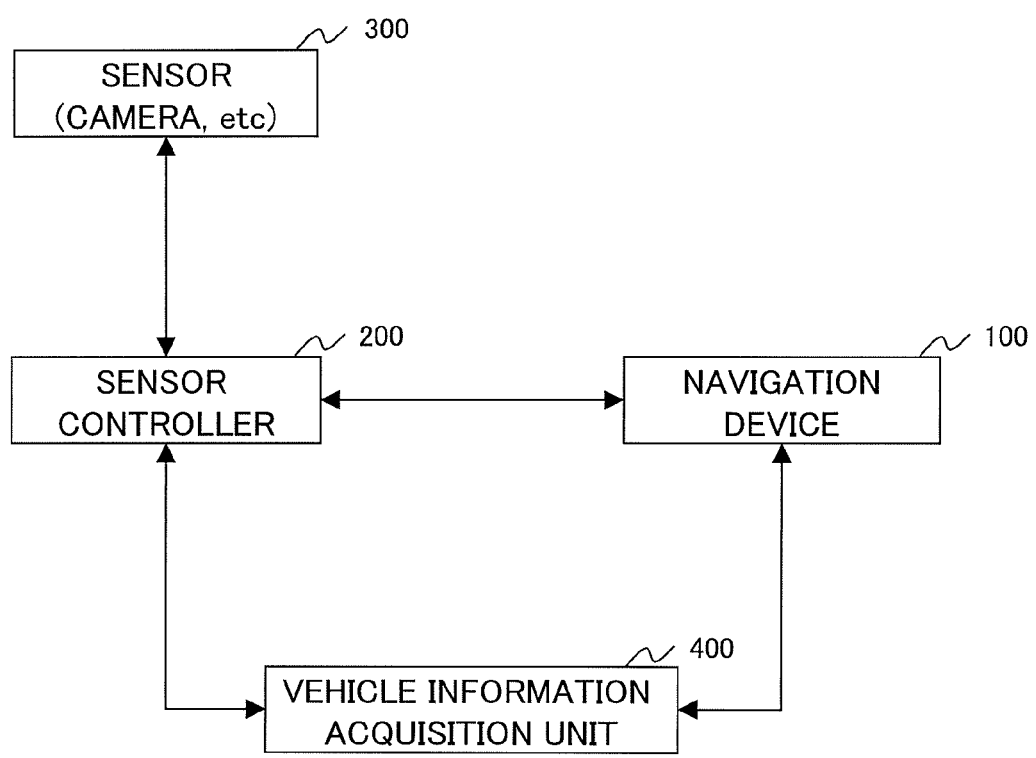
FIG. 1 is a schematic block diagram of a sensor control system.

FIG. 1 is a diagram showing an overview configuration of the sensor control system that is mounted on a vehicle.

The sensor control system incorporates a navigation device 100, a sensor controller 200, a sensor (e.g., a camera) 300, and a vehicle information acquisition unit 400.

It is to be noted that each of the units described above is connected via an in-vehicle network (not illustrated), such as the CAN (Controller Area Network) and the FlexRay.

The navigation device 100 is a unit which shows a driver, information as to the current position and geographical information up to a destination, by using an image, voice, and the like.

The sensor controller 200 accepts information detected by the sensor 300 being connected, and transmits the information to the navigation device 100, and the like. The sensor controller further accepts the geographical information from the navigation device 100, and controls the sensor 300 according to the traveling state.

The sensor 300 detects the state around the vehicle on which the sensor is mounted, and transfers the detected information to the sensor controller 200 and the navigation device 100. By way of example, a camera, or the like, captures an image of the surrounding state, and thus obtained video information is transferred to the sensor controller 200. In addition, sonar, radar, or the like, detects an obstruction existing in the surrounding area and the detected information is transferred to the sensor controller 200.

The vehicle information acquisition unit 400 acquires vehicle information of the vehicle on which the unit itself is installed, such as a traveling speed, a traveling direction, a direction indicator (blinker) operational information, and a gearshift position, and transmits those information items, in response to an information request from the navigation device 100 or the sensor controller 200.

Figure 2:
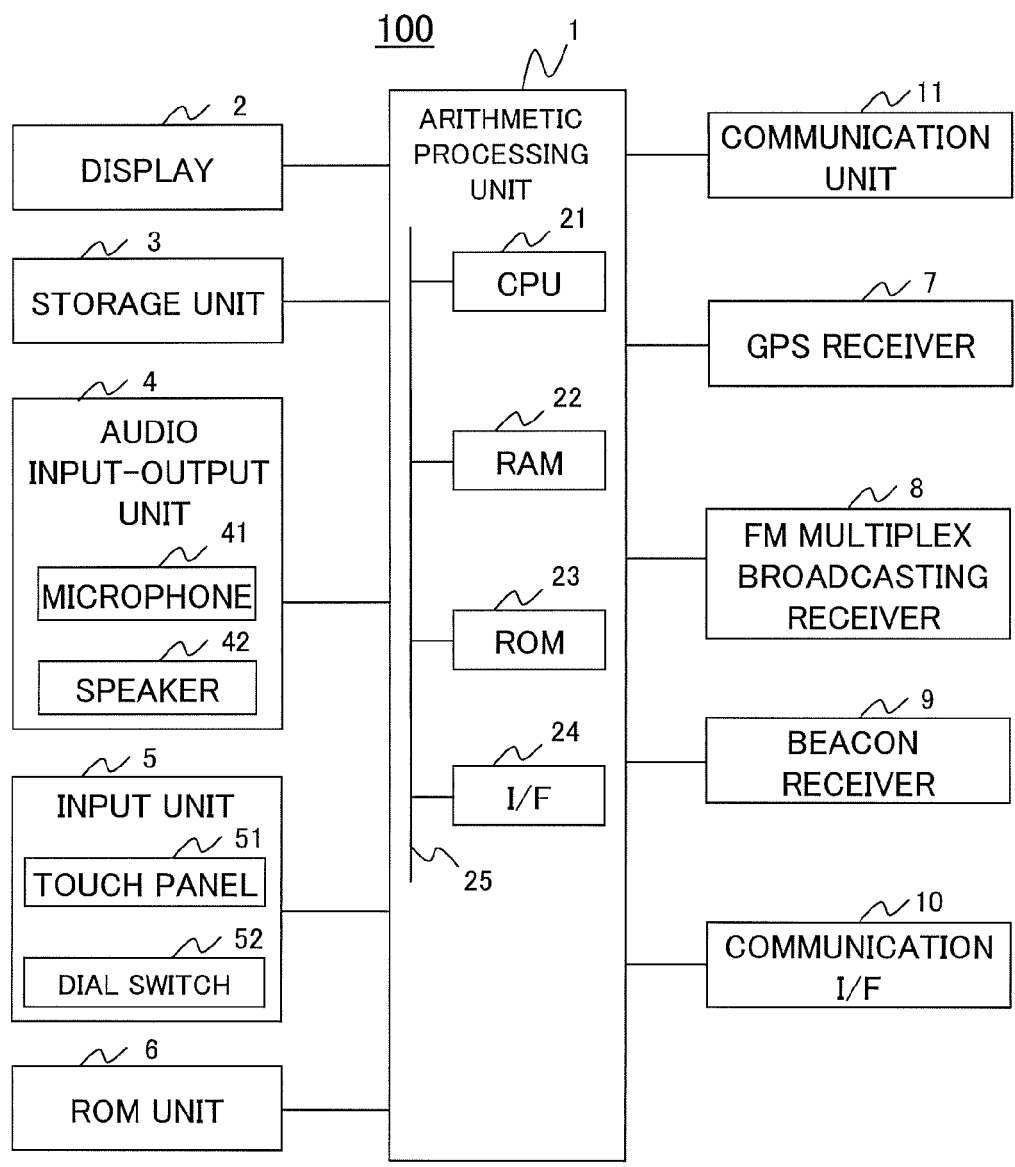
FIG. 2 is a schematic block diagram of a navigation device.

FIG. 2 is a block diagram showing the configuration of the navigation device 100 constituting the sensor control system.

The navigation device 100 is provided with an arithmetic processing unit 1, a display 2, a storage unit 3, an audio input-output unit 4 (a microphone 41 is provided as the audio input unit and a speaker 42 is provided as the audio output unit), an input unit 5, an ROM unit 6, a GPS (Global Positioning System) receiver 7, an FM multiplex broadcasting receiver 8, a beacon receiver 9, a communication I/F (interface) 10, and a communication unit 11.

The arithmetic processing unit 1 is a main unit for performing various processing. By way of example, the arithmetic processing unit 100 detects a current position, based on the information such as the vehicle traveling speed and the traveling direction obtained from vehicle information acquisition unit 400, and the information outputted from the GPS receiver 7, the FM multiplex broadcasting receiver 8, and the like. On the basis of the current positional information being obtained, the arithmetic processing unit 1 reads out from the storage unit 3 or from the ROM unit 6, map data necessary to create a display.

The arithmetic processing unit 1 graphically expands the map data being read out, and displays a mark indicating the current position on the display 2 in such a manner as superimposing thereon. The arithmetic processing unit 1 uses the map data, and the like, stored in the storage unit 3 or in the ROM unit 6 to search for an optimum route (recommended route) connecting a departure place (or a current position) with a destination designated by the user. It further uses the speaker 42 and the display 2 to guide the user.

The arithmetic processing unit 1 accepts the information around the vehicle, obtained from the sensor 300 via the sensor controller 200, information for specifying a lane currently the vehicle is traveling, and the like, and performs a detailed route guidance.

Furthermore, upon receipt of warning or caution information from the sensor 200, the arithmetic processing unit 1 outputs the information to the display 2 and the speaker 42.

The arithmetic processing unit 1 of the navigation device 100 has a configuration in which each device is connected via a bus 25. The arithmetic processing unit 1 incorporates a CPU (Central Processing Unit) 21 for executing various processes such as numerical processing and control of each device, RAM (Random Access Memory) 22 for storing map data, operation data, and the like, read out from the storage unit 3, ROM (Read Only Memory) 23 for storing programs and data, and an I/F (interface) 24 for establishing connection between various hardware and the arithmetic processing unit 1.

The display 2 is a unit for displaying graphics information generated by the arithmetic processing unit 1, and the like. The display 2 is made up of a liquid crystal display, an organic EL (Electro-Luminescence) display, or the like.

The storage unit 3 is made up of a storage medium at least readable and writable, such as an HDD (Hard Disk Drive) and a non-volatile memory card.

This storage medium stores a link table 150, being the map data (including link data of links constituting roads on a map) which is necessary for a typical route searching unit.

Figure 3:
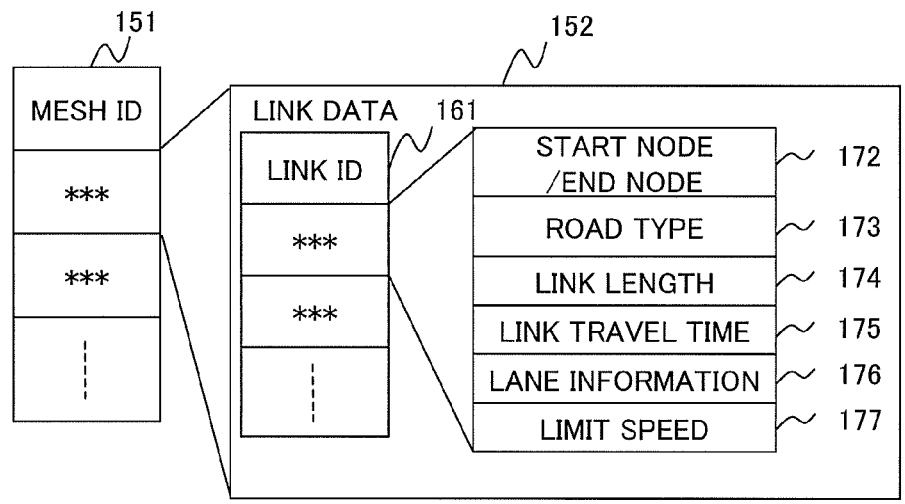
FIG. 3 illustrates a structure of a link table.

FIG. 3 illustrates a configuration of a link table 150. The link table 150 includes link data 152 with respect to each identification code (mesh ID) 151 indicating a mesh being a region partitioned on the map, the link data representing each link constituting a road included in the mesh region.

The link data 152 includes with respect to each link ID 161 being an identification of the link, coordinate information 172 of two nodes (a start node and an end node) constituting the link, a road type 173 indicating type information of the road including the link (also including information for specifying whether or not up and down lines are separated on the road), link length information 174 indicating a length of the link, a link travel time 175 stored in advance, lane information 176 indicating the number of lanes of the link and an attribute of the lane (e.g., right-turn-only lane), and a speed limit 177 representing a speed limit of the road including the link.

It is to be noted here that there is a distinction between a start node and an end node being the two nodes constituting a link, thereby allowing up-line and down-line of the same road to be managed as links different from each other.

Here, an explanation will be made, referring to FIG. 2 again. The audio input and output unit 4 is provided with the microphone 41 as an audio input unit, and the speaker 42 as an audio output unit. The microphone 41 captures audio data from the outside of the navigation device 100, such as voice of a driver and other passengers.

The speaker 42 outputs a message to the user as an audio signal, generated by the arithmetic processing unit 1. The microphone 41 and the speaker 42 are separately mounted on predetermined portions of a vehicle. It is to be noted that an enclosure may accommodate these elements in an integrated manner. The navigation device 100 may be provided with multiple microphones 41 and multiple speakers 42.

The input unit 5 is a unit for accepting a directive from the user, via a manipulation by the user. The input unit 5 is made up of a touch panel 51, a dial switch 52, and other hard switches (not illustrated) such as a scroll key and a scaling key.

The touch panel 51 is mounted on a display screen side of the display 2, being a transparent to make the display screen visible. The touch panel 51 is used to specify a touch position in association with XY coordinates of the image displayed on the display 2, convert the touch position to coordinates, and output the coordinates. The touch panel 51 is made up of pressure-sensitive type or electrostatic type input detecting elements, or the like.

The dial switch 52 is constructed in rotatable manner, both in the clockwise direction and in the anti-clockwise direction, issues a pulse signal according to a rotation by a predetermined angle, and outputs the pulse signal to the arithmetic processing unit 1. The arithmetic processing unit 1 obtains a rotation angle based on the number of the pulse signals.

The ROM unit 6 is made up of a storage medium, at least readable, such as an ROM (Read Only Memory) including a CD-ROM, a DVD-ROM, and the like, and an IC (Integrated Circuit) card. This storage medium stores video data, audio data, and the like, for instance.

The GPS receiver 7 is used by the navigation device 100 to detect a current position (location of the self vehicle). The GPS receiver 7 receives a signal from a GPS satellite, measures a distance between the moving object and the GPS satellite, and a rate of change of the distance, with respect to at least three satellites, thereby obtaining the current position, a traveling speed, and traveling azimuth of the moving object.

The FM multiplex broadcasting receiver 8 receives an FM multiplex broadcasting signal that is transmitted from an FM multiplex broadcasting station. The FM multiplex broadcasting information includes brief current traffic information, information on restrictions, SA/PA (service area/parking area) information, parking lot information, weather information, and the like, according to the VICS (Vehicle Information Communication System: registered trademark), and character information and the like, provided by a radio station as FM multiplex general information.

The beacon receiver 9 receives the VICS information and the like, including brief current traffic information, information on restrictions, SA/PA (service area/parking area) information, parking lot information, weather information, emergency alert, and the like. By way of example, it is a unit to receive an optical beacon for optical communication, a radio beacon for radio communication, or the like.

The communication I/F 10 establishes communication via an in-vehicle network such as the CAN and the Flex Ray, with other devices connected to the network.

The communication unit 11 is a unit which establishes wireless communication with a base station existing outside, and the like, for example, being a mobile phone or a DCM (Data Control Module). The communication unit is capable of establishing communication with other device (e.g., an information provision server, or the like, in an outside information center, or the like), via a mobile phone network, the Internet, or the like, for example.

Figure 4:
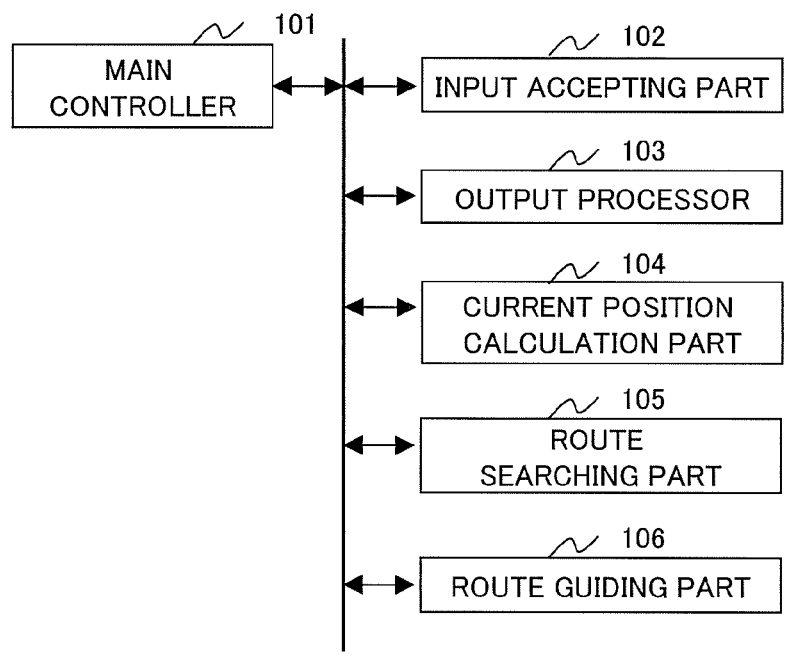
FIG. 4 is a functional block diagram of an arithmetic processing unit in the navigation device.

FIG. 4 is a functional block diagram of the arithmetic processing unit 1.

As illustrated, the arithmetic processing unit 1 includes a main controller 101, an input accepting part 102, an output processor 103, a current position calculation part 104, a route searching part 105, and a route guiding part 106.

The main controller 101 is a key functional part for performing various processing, and controls other processors according to processing descriptions. The main controller 101 further acquires information from various sensors, the GPS receiver 7, and the like, and requests the current position calculation part 104 and the like, to specify a current position. In addition, the main controller 101 establishes associations between a date and time when traveled, and the position, as needed, and stores in the storage unit 3, a traveled route history with respect to each link. In response to a request from each of the processors, the main controller 101 outputs the current clock time.

The main controller 101 further acquires video and the like, being taken by the sensor 300, as image data from the sensor controller 200 via the communication I/F 10. Then the main controller displays the acquired image data on the display 2 or the like.

Upon accepting warning information or caution information from the sensor controller 200, the main controller outputs such information to the display 2 and the speaker 42, to call for user's attention.

The input accepting part 102 accepts a directive from the user, inputted via the input unit 5 or the microphone 41, and controls each part of the arithmetic processing unit 1 so as to execute the processing associated with the requested descriptions. By way of example, when the user requests to search for a recommended route, the output processor 103 is requested to perform the processing to show a map on the display 2, so as to allow a setting of a destination.

The output processor 103 receives screen information to be displayed, converts the screen information into signals used for drawing on the display 2, and gives a directive to the display 2 to perform the drawing.

The current position calculation part 104 acquires via the main controller 101, the traveling speed and the traveling direction of the vehicle calculated from change in orientation, those information items being obtained via the vehicle information acquisition unit 400, and information from the GPS receiver 7, and the like. Then, the current position calculation part obtains on the link, a feasible current position point, by using the map data and the like, stored in the storage unit 3 or in the ROM unit 6.

The route searching part 105 searches for an optimum route (recommended route) connecting the departure place (current position) with the destination, indicated by the user. By way of example, the route searching part 105 retrieves a route which minimizes cost of the route (e.g., distance and travel time) connecting designated two points (the departure place and the destination), by using Dijkstra's Algorithm, or the like. It is to be noted that multiple nodes being points placed at positions indicating a road, and links each connecting the two nodes are continuously and sequentially joined, thereby specifying the route. The route searching part 105 may receive a route retrieved by an outside information center or the like, via the communication unit 11, assuming this route as a result of the search.

In addition, the route searching part 105 computes the sum of the cost given in advance to each node and each link included in the route, and the cost of all through the route is obtained. Then, the route searching part 105 calculates the time required until reaching the destination or a via-point, by going through the route, and stores route information for specifying the route in a predetermined area within the RAM 22 or in the storage unit 3.

The route guiding part 106 uses the speaker 42 and the display 2 to guide the user, so as to prevent a deviation from the recommended route retrieved by the route searching part 105. By way of example, the route guiding part shows on the display 2, the traveling direction and the like, at an intersection or the like. In addition, if need arises, information indicating the traveling direction is outputted as a voice from the speaker 42, thereby showing the recommended route.

It is to be noted that the CPU 21 reads predetermined programs and executes the programs, thereby implementing each functional part of the aforementioned arithmetic processing unit 1, i.e., the main controller 101, the input accepting part 102, the output processor 103, the current position calculation part 104, the route searching part 105, and the route guiding part 106. For that purpose, the RAM 22 stores programs for implementing the process of each of the functional parts.

It is to be noted that the constitutional elements described above are categorized according to the processing descriptions, so as to facilitate understanding of the configuration of the navigation device 100. The way how the constitutional elements are categorized or the names thereof may not restrict the scope of the present invention. The configuration of the navigation device 100 may be categorized into more various constitutional elements according to processing descriptions. It is alternatively possible to categorize the elements in such a manner that one constitutional element executes more various processing.

It is further possible that each of the functional parts is established by using hardware (ASIC, GPU, or the like). A piece of hardware may execute the processing of each of the functional parts, or multiple pieces of hardware may execute the same.

Figure 5:
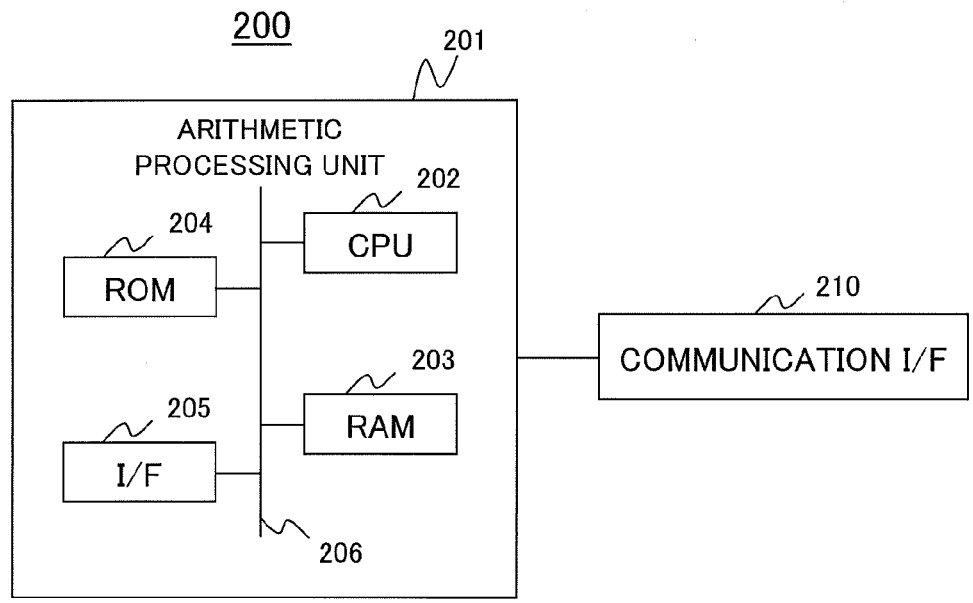
FIG. 5 is a hardware block diagram of the sensor controller.

As shown in FIG. 5, the sensor controller 200 incorporates an arithmetic processing unit 201 and a communication I/F 210.

The arithmetic processing unit 201 is a main unit for performing various processing. By way of example, via the communication I/F 210, the arithmetic processing unit acquires geographical information from the navigation device 100, and vehicle information from the vehicle information acquisition unit 400. Then, upon figuring out a vehicle moving state based on those information items thus acquired, the arithmetic processing unit controls the sensor 300 depending on the vehicle moving state.

The arithmetic processing unit 201 further processes the information acquired from the sensor 300, specifies a lane where the vehicle is traveling, for example, and transmits the information of the specified lane to the navigation device 100. The arithmetic processing unit 201 has a configuration that each device is connected via the bus 206. The arithmetic processing unit 201 includes a CPU 202 for executing various processing such as numerical processing and a control of each device, RAM 203 for storing map data, operation data, and the like, ROM 204 for storing programs and data, an I/F (interface) 205 for establishing connection between the arithmetic processing unit 201 and various hardware.

The communication I/F 210 is a unit for establishing communication with other devices connected to the network, via the in-vehicle network such as the CAN and the Flex Ray.

Figure 6:
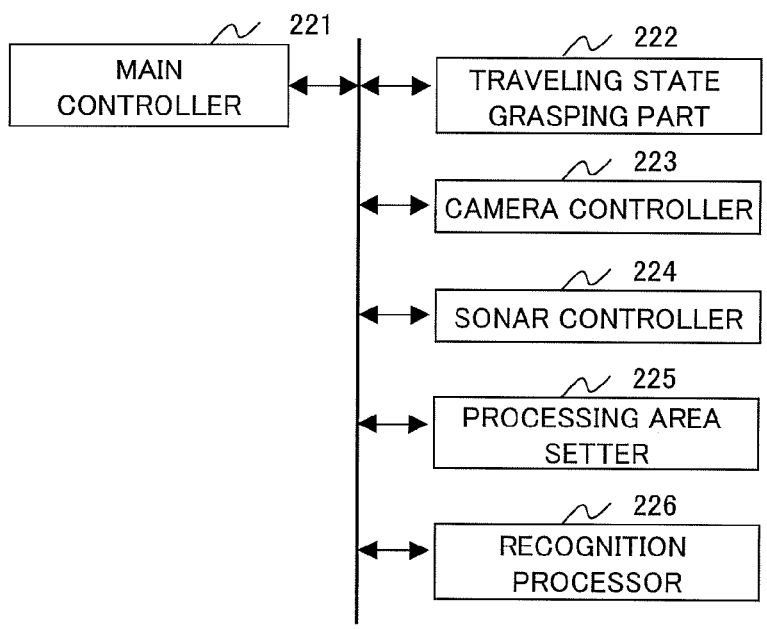
FIG. 6 is a functional block diagram of an arithmetic processing unit in the sensor controller.

FIG. 6 is a functional block diagram showing the arithmetic processing unit 201. As illustrated, the arithmetic processing unit 201 incorporates a main controller 221, a traveling state grasping part 222, a camera controller 223, a sonar controller 224, a processing area setter 225, and a recognition processor 226.

The main controller 221 is a key functional part for performing various processing, and controls other processors depending on the processing descriptions.

The traveling state grasping part 222 grasps the traveling state of the vehicle, based on the information obtained from the navigation device 100, the sensor 300, and the vehicle information acquisition unit 400. For example, the traveling state grasping part figures out that the place now traveling is a narrow road based on the information of the current position and the map information.

The camera controller 223 controls the operation of the camera, which is one type of the sensor 300. Byway of example, the camera controller sets the timing to start and end of imaging by the camera. In addition, the camera controller controls transmission of the captured image to the navigation device 100.

The sonar controller 224 controls the operation of sonar which is one type of the sensor 300. By way of example, the sonar controller sets the timing to start and end of detection by the sonar. In addition, the sonar controller controls transmission of reflected wave information being detected, to the navigation device 100.

The processing area setter 225 sets an area to be processed in the information acquired from the sensor 300. On this occasion, the processing area setter 225 receives the information for specifying the vehicle traveling state from the traveling state grasping part 222, and sets the area to be processed depending on the state.

The recognition processor 226 executes various recognition processes on the information acquired from the sensor 300, with regard to the area to be processed set by the processing area setter 225, and transmits the processing result to the navigation device 100.

It is to be noted that the CPU 202 reads predetermined programs and executes the programs, thereby implementing each functional part of the aforementioned arithmetic processing unit 201, i.e., the main controller 221, the traveling state grasping part 222, the camera controller 223, the sonar controller 224, the processing area setter 225, and the recognition processor 226. For that purpose, the RAM 203 stores programs for implementing the process of each of the functional parts.

It is to be noted that the constitutional elements described above are categorized according to the processing descriptions, so as to facilitate understanding of the configuration of the sensor controller 200. A way how to categorize the constitutional elements or the names thereof may not restrict the scope of the present invention. The configuration of the sensor controller 200 may be categorized into more various constitutional elements according to processing descriptions. It is alternatively possible to categorize the elements in such a manner that one constitutional element executes more various processing.

It is further possible that each of the functional parts is established by using hardware (ASIC, GPU, or the like). A piece of hardware may execute the processing of each of the functional parts, or multiple pieces of hardware may execute the same.

Figure 7A:
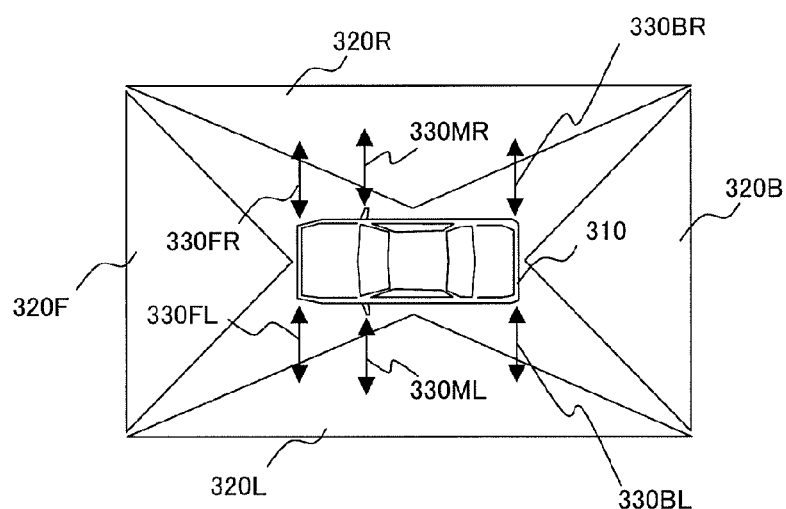
FIGS. 7A and 7B illustrate areas detectable by the sensor.
Figure 7B:
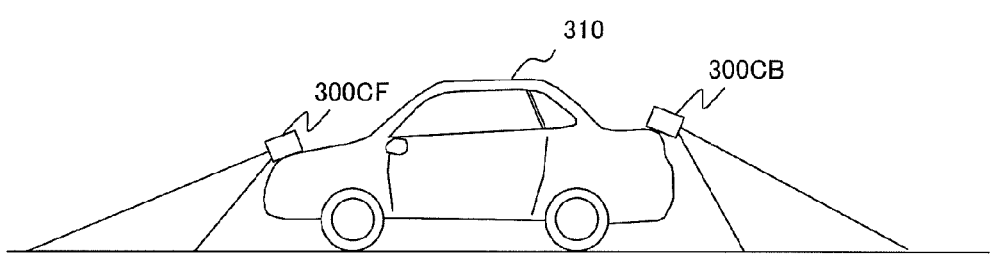

FIGS. 7A and 7B illustrate areas detectable by the camera and the sonar, each being the sensor 300. As shown in FIG. 7A, multiple cameras installed on the vehicle 310 take images of the following areas to perform detection; imaging area 320F being the area for imaging the front side of the vehicle 310, the right imaging area 320R being the area for imaging the right side thereof, the rear imaging area 320B being the area for imaging the rear side thereof, and the left imaging area 320L being the area for imaging the left side thereof. In addition, the cameras transfer the captured video pictures to the sensor controller 200.

As shown in FIG. 7A, a plurality of sonar installed on the vehicle 310 detect obstructions on the side, with regard to the front part, side-mirror part, and rear part of the vehicle 310. The right detection area on the front of the vehicle 310 corresponds to 330FR, and the left detection area on the front of the vehicle corresponds to 330FL. The right detection area on the side-mirror part of the vehicle 310 corresponds to 330MR, and the left detection area on the side-mirror part of the vehicle corresponds to 330ML. The right detection area on the rear part of the vehicle 310 corresponds to 330BR, and the left detection area on the rear part of the vehicle corresponds to 330BL. An external device, such as the sensor controller 200, may set a distance from the sonar to the obstruction, the distance allowing the detection by the sonar. In addition, the sonar transfers the information of the obstruction being detected to the sensor controller 200.

As shown in FIG. 7B, it is to be noted, for instance, that the camera is installed on the front and on the rear of the vehicle 310 in such a manner as bending down to a certain degree, allowing the road surface to be captured (300CF, 300CB). The camera uses imaging elements such as a CCD (Charge Coupled Device) and a CMOS (Complementary Metal Oxide Semi conductor) image sensor, to take images of the ground surface on the front and rear of the vehicle.

Figure 8:
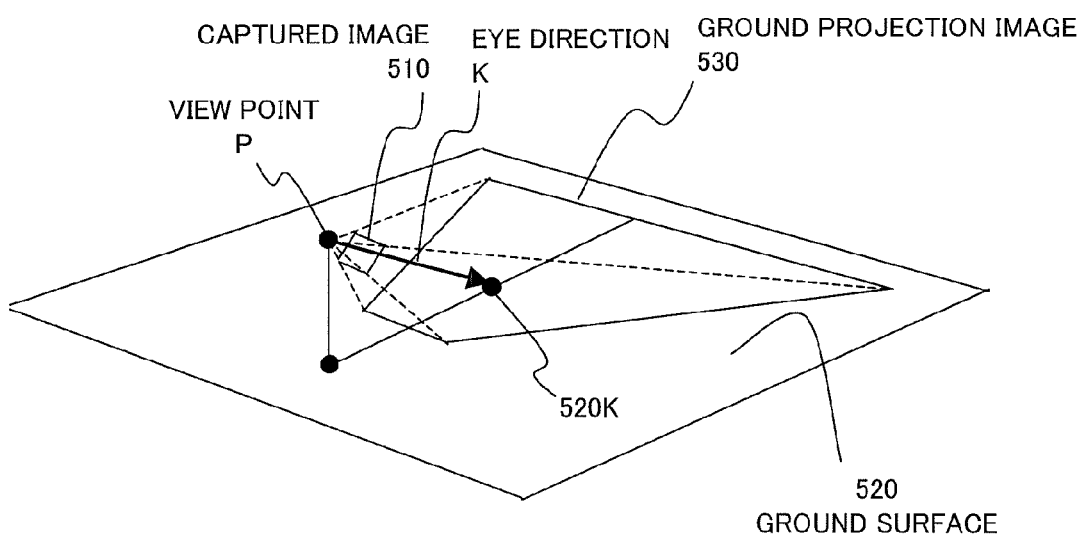
FIG. 8 illustrates a way how a captured image is projected on the ground surface.

FIG. 8 illustrates a method for the sensor controller 200 to generate a ground projection image, by using the video pictures captured by the camera 300CF shown in FIG. 7B. The main controller 221 of the sensor controller 200 obtains a position of the viewpoint P of the camera 300CF (a coordinate position in three-dimensional space assuming a predetermined position in the vehicle as the origin) and an imaging direction (eye direction) K. Then, the main controller 221 projects the captured image 510 on the ground surface 520, from the position of the viewpoint P of the camera 300CF facing to the imaging direction K, thereby generating a ground projection image 530. It is to be noted that the imaging direction K perpendicularly crosses the center of the captured image 510. In addition, a distance from the viewpoint P of the camera 300CF to the captured image 510 is determined in advance. The ground projection image 530 thus generated becomes an image like a bird-eye view, viewing the surroundings of the vehicle from high in the skies. It is a matter of course that not only the camera 300CF, but also other cameras mounted on the vehicle generate the images in the same manner.

Figure 9:
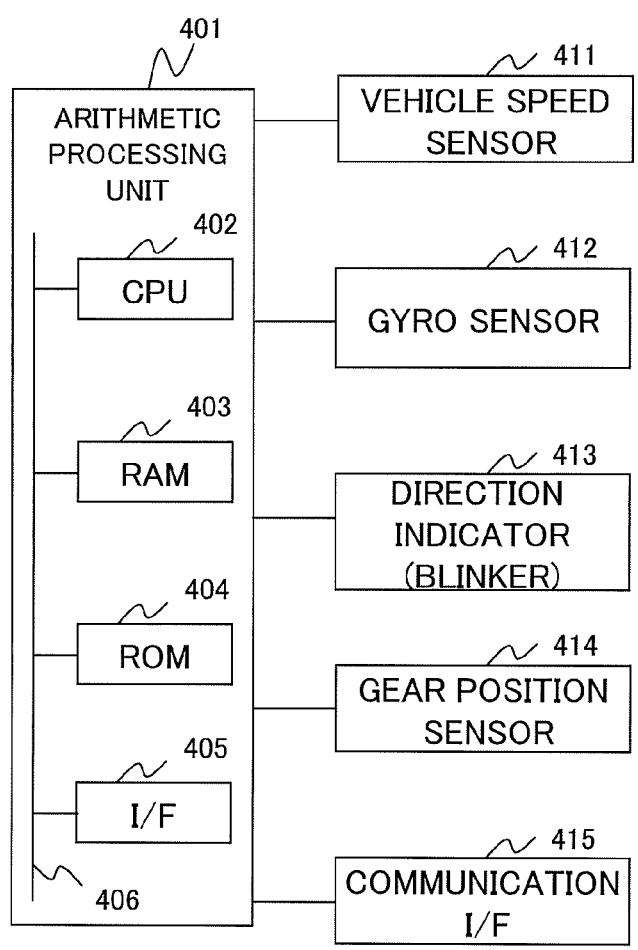
FIG. 9 is a schematic block diagram of a vehicle information acquisition unit.

As shown in FIG. 9, the vehicle information acquisition unit 400 incorporates an arithmetic processing unit 401, a vehicle speed sensor 411, a gyro sensor 412, a direction indicator (blinker) 413, a gear position sensor 414, and a communication I/F 415.

The arithmetic processing unit 401 is a main unit for performing various processing. By way of example, the arithmetic processing unit 401 transmits the information of the vehicle, acquired from the vehicle speed sensor 411, the gyro sensor 412, the direction indicator 413, the gear position sensor 414, and the like, to the navigation device 100 and the sensor controller 200, via the communication I/F 415.

The arithmetic processing unit 401 of the vehicle information acquisition unit 400 has a configuration that each device is connected via the bus 406. The arithmetic processing unit 401 includes a CPU 402 for executing various processing such as numerical processing and a control of each device, RAM 403 for storing map data, operation data, and the like, ROM 404 for storing programs and data, an I/F (interface) 405 for establishing connection between the arithmetic processing unit 401 and various hardware.

The vehicle speed sensor 411 is a sensor for outputting a value that is used to calculate the vehicle speed.

The gyro sensor 412 is made up of an optical fiber gyroscope, a vibrating gyroscope, or the like, to detect an angular rate according to a rotation of the moving object.

The direction indicator (blinker) 413 operates to output a direction that is indicated by the direction indicator lamp of the vehicle.

The gear position sensor 414 acquires information for specifying a position of a drive gear of the vehicle, and outputs the information.

The communication I/F 415 is a unit for establishing communication with other devices connected to the network, via the in-vehicle network such as the CAN and the Flex Ray.

[Description of the Operation]

Next, an operation of the sensor control system will be explained.

FIG. 10 is a flow diagram showing a traveling lane recognition process for specifying with a high degree of precision, a lane where a vehicle equipped with the sensor control system is traveling.

This flow is executed during a traveling on a predetermined road.

Firstly, the recognition processor 226 of the sensor controller 200 performs a normal lane recognition process by using the camera serving as the sensor 300 (step S001). Specifically, the processing area setter 225 of the sensor controller 200 sets a processing area as a normal area, with regard to an image obtained by capturing the surroundings of the vehicle, for example, the left and right ground surfaces. Then, the recognition processor 226 instructs the camera controller 223 to start imaging. The recognition processor 226 performs a white line recognition process on a predetermined area within the image corresponding to the normal processing area being set, and specifies a lane in which the vehicle is traveling, according to the white line pattern being recognized.

Next, the recognition processor 226 of the sensor controller 200 determines whether or not the lane being recognized is neither the leftmost lane nor the rightmost lane (step S002). Specifically, the recognition processor 226 of the sensor controller 200 determines whether or not the lane recognized in the step S001 is neither the leftmost lane nor the rightmost lane. On this occasion, the recognition processor 226 determines the vehicle is traveling in either of the leftmost and the rightmost lane, if road-surface paint being the closest to the vehicle in the left-side image of the vehicle, or road-surface paint being the closest to the vehicle in the right-side image of the vehicle, is a seamless white line. On the other hand, the recognition processor 226 determines the vehicle is traveling in neither the leftmost lane nor the rightmost lane, if road-surface paint being the closest to the vehicle in the left-side image of the vehicle, or road-surface paint being the closest to the vehicle in the right-side image of the vehicle, is a broken line, i.e., a white dashed line.

If the lane being recognized is either of the leftmost lane and the rightmost lane ("No" in the step S002), the recognition processor 226 accepts the recognized lane as the traveling lane, and terminates the traveling lane recognition process.

If the lane being recognized is neither the leftmost lane nor the rightmost lane ("Yes" in the step S002), the traveling state grasping part 222 acquires from the navigation device 100, information regarding the link where the vehicle is traveling (step S003).

Specifically, the traveling state grasping part 222 requests the navigation device 100 to provide information of the link to which the current position belongs. Then, the main controller 101 of the navigation device 100 acquires from the link table 150, the link data 152 with regard to the link to which the current position belongs, and transmits the link data to the sensor controller 200.

Next, the traveling state grasping part 222 determines whether or not the number of lanes information is included in the link information (step S004). Specifically, the traveling state grasping part 222 reads the lane information 176 included in the link data 152 currently traveling, being acquired in the step S003, and determines whether or not the number of lanes information is included in the lane information 176.

If the number of lanes information is not included in the link information ("No" in the step S004), the process of the traveling state grasping part 222 proceeds to the step S006.

If the number of lanes information is included in the link information ("Yes" in the step 004), the traveling state grasping part 222 determines whether or not the number of lanes information indicates equal to or more than four lanes each way (step S005).

If the number of lanes information is not equal to or more than four lanes each way ("No" in the step S005), the recognition processor 226 identifies the central lane as the traveling lane, and terminates the traveling lane recognition process.

If the number of lanes information is equal to or more than four lanes each way ("Yes" in the step S005), the processing area setter 225 expands the processing region of the information detected by the sensor 300, and performs the lane recognition process (step S006).

Specifically, the processing area setter 225 sets the processing area which is expanded larger than the normal state, as the processing area in the image obtained by capturing the surroundings of the vehicle, e.g., the left and the right ground surfaces. Then, the recognition processor 226 instructs the camera controller 223 to start imaging. The recognition processor 226 performs the white line recognition process on a predetermined area in the image, corresponding to the processing area being set after expanded, within the captured image, and specifies a lane in which the vehicle is traveling, according to a pattern of the white line being recognized.

Then, the recognition processor 226 terminates the traveling lane recognition process.

The processing description of the traveling lane recognition process has been explained so far.

According to the traveling lane recognition process, even when the vehicle is traveling in the lane other than the leftmost and rightmost lanes, on a road provided with at least four lanes each way, it is facilitated to specify which lane the vehicle is traveling.

One Embodiment of the Present Invention has been Explained

According to one embodiment of the present invention, the sensor control system is allowed to set a processing region for lane detection, enough appropriate for the traveling circumstances, so as to specify the lane in which the vehicle is traveling. Then, by using the information as to the traveling lane being detected, the current position is able to be obtained more precisely.

Each of FIGS. 11A, 11B, 11C and 11D illustrates a comparative example of the present invention, and illustrates recognition results of traveling lane according to the control system, which recognizes the traveling lane without using the traveling lane recognition process relating to the present invention.

Each of FIG. 11A to FIG. 11D includes a left-side captured image 601L showing the left side of the vehicle according to a camera, a right-side captured image 601R showing the right side of the vehicle according to a camera, and an illustration 602 showing the lane specified by those two images. Here, it is assumed that the number of lanes on the road where the vehicle 603 is traveling is four lanes each way.

Figure 11A:
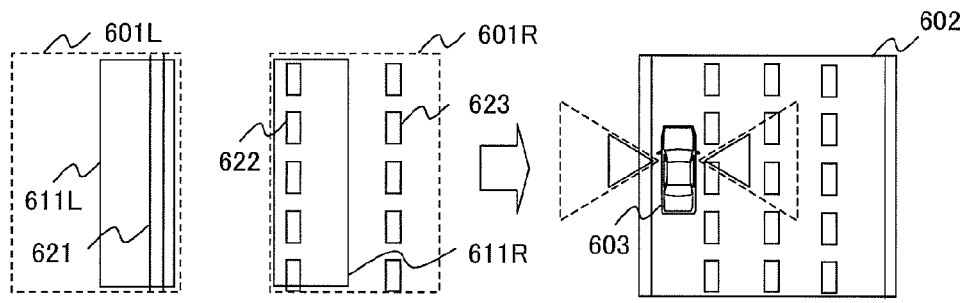
FIGS. 11A, 11B, 11C and 11D illustrate comparison results of the traveling lane recognition.

As shown in FIG. 11A, as for the left-side captured image 601L, a region being a processing target is set as the left-side image processing area 611L. The left-side image processing area 611L indicates a portion closer to the vehicle, out of the portions obtained by dividing the left-side captured image into right and left.

On the other hand, as for the right-side captured image 601R, the region being a processing target is set as the right-side image processing area 611R. Here, it is assumed that those areas as the processing targets are set in the same manner for each case shown in FIG. 11A to FIG. 11D in common.

In FIG. 11A, continuous white-line road paint 621 is captured into the left-side image processing area 611L, and discontinuous white broken-line road paint 622 is captured into the right-side image processing area 611R. Therefore, it is possible to determine that the vehicle 603 is traveling in the leftmost lane.

Figure 11B:
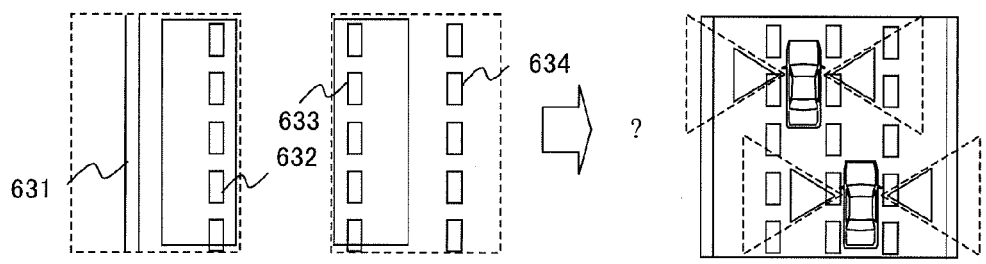
Figure 11C:
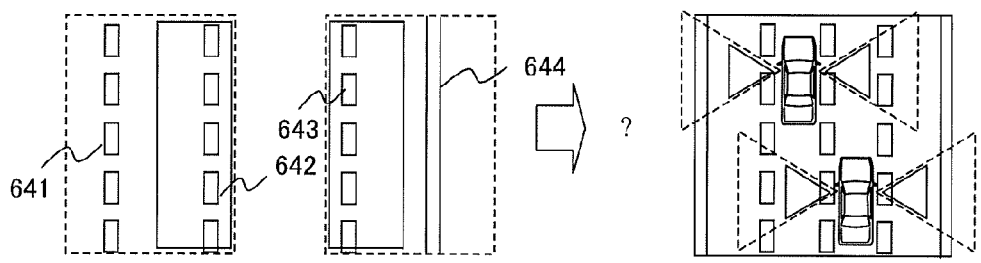
Figure 11D:
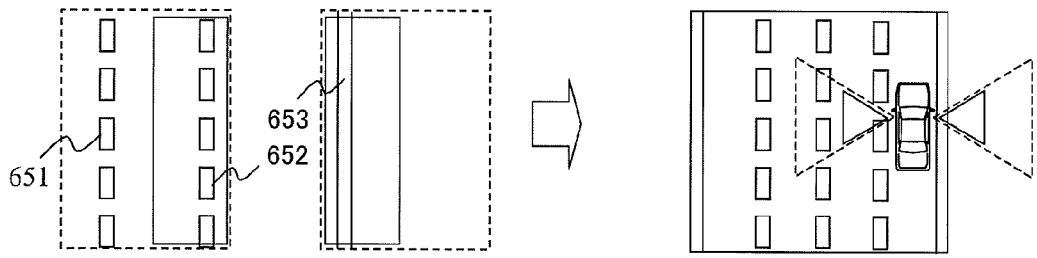

Similarly in FIG. 11D, discontinuous white broken-line road paint 652 is captured into the left-side image processing area 611L, and continuous white-line road paint 653 is captured into the right-side image processing area 611R. Therefore, it is possible to determine that the vehicle 603 is traveling in the rightmost lane.

However, in FIG. 11B and FIG. 11C, it is not possible to draw distinction between the case where the vehicle 603 is traveling in the second lane from the left and the case where it is traveling in the second lane from the right.

This is because in FIG. 11B, discontinuous white broken-line road paint 632 is captured into the left-side image processing area 611L, and discontinuous white broken-line road paint 633 is also captured into the right-side image processing area 611R. Therefore, it is impossible to distinguish which lane the vehicle is traveling.

A similar explanation is also applied to FIG. 11C. This is because, as for FIG. 11C, discontinuous white broken-line road paint 642 is included in the left-side image processing area 611L, and discontinuous white broken-line road paint 643 is also included in the right-side image processing area 611R.

In other words, if the traveling lane recognition process relating to the present invention is not performed, it is not possible to recognize the traveling lane on the road including equal to or more than four lanes each way, under the condition that the processing area of the captured image is limited to a uniformly reduced area.

On the other hand, Each of FIGS. 12A, 12B, 12C and 12D illustrates results of traveling lane recognition according to the control system which recognizes the traveling lane by using the traveling lane recognition process relating to the present invention.

Each of FIG. 12A to FIG. 12D includes a left-side captured image 601L showing the left side of the vehicle according to a camera, a right-side captured image 601R showing the right side of the vehicle according to a camera, and an illustration 602 showing the lane specified by those two images. Here, it is assumed that the number of lanes on the road where the vehicle 603 is traveling is four lanes each way.

Figure 12A:
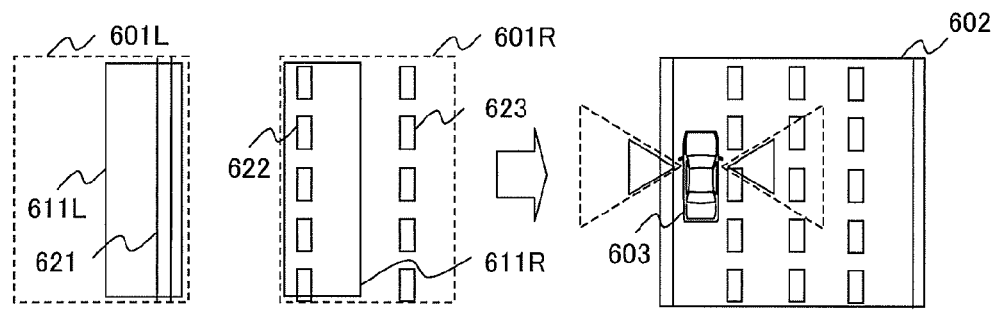
FIGS. 12A, 12B, 12C and 12D illustrate results of the traveling lane recognition process according to the present invention.

As shown in FIG. 12A, as for the left-side captured image 601L, a region being a processing target is set as the left-side image processing area 611L. The left-side image processing area 611L indicates a portion closer to the vehicle, out of the portions obtained by dividing the left-side captured image into right and left. On the other hand, as for the right-side captured image 601R, the region being a processing target is set as the right-side image processing area 611R.

In FIG. 12A, continuous white-line road paint 621 is captured into the left-side image processing area 611L, and discontinuous white broken-line road paint 622 is captured into the right-side image processing area 611R. Therefore, it is possible to determine the lane in the step 001, with a result that the vehicle 603 is traveling in the leftmost lane. In other words, it is possible to determine the traveling lane without expanding the detection area.

Figure 12B:
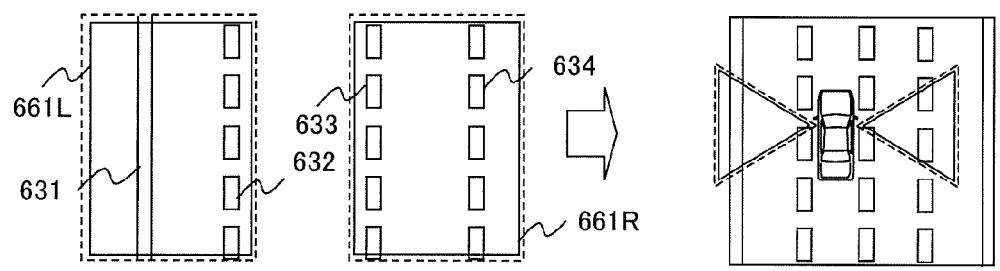
Figure 12C:
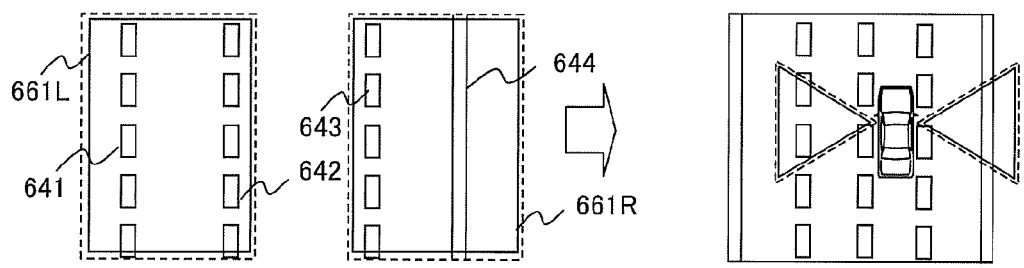
Figure 12D:
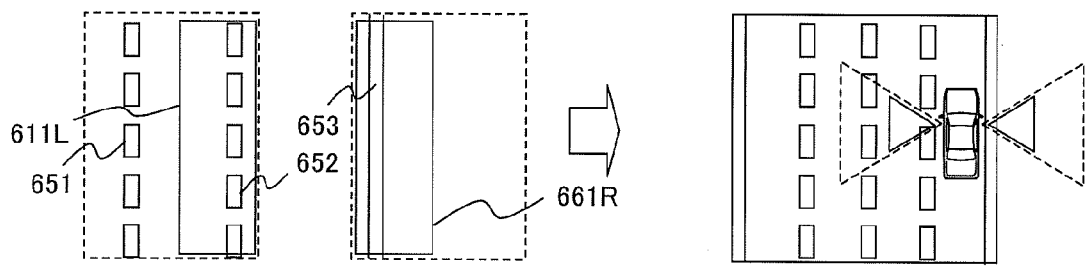

Similarly in FIG. 12D, discontinuous white broken-line road paint 652 is captured into the left-side image processing area 611L, and continuous white-line road paint 653 is captured into the right-side image processing area 611R. Therefore, it is possible to determine that the vehicle 603 is traveling in the rightmost lane, without expanding the detection area.

As for the cases in FIG. 12B and FIG. 12C, as mentioned above, if the traveling lane recognition process relating to the present invention is not used, it is not possible to recognize the traveling lane. However, usage of the traveling lane recognition process relating to the present invention enables the recognition of the traveling lane.

In FIG. 12B, the left-side image processing area 661L setting the entire left-side captured image 601L as a processing area, includes both continuous white-line road paint 631 and discontinuous white broken-line road paint 632. The right-side image processing area 661R setting the entire right-side captured image 601R as a processing area includes both discontinuous white broken-line road paint 633 and discontinuous white broken-line road paint 634. Therefore, it is possible to recognize that the vehicle is traveling in the second lane from the left, according to the position of the continuous white line.

A similar explanation is also applied to FIG. 12C. In FIG. 12C, the left-side image processing area 661L setting the entire left-side captured image 601L as a processing area includes discontinuous white broken-line road paint 641 and discontinuous white broken-line road paint 642. The right-side image processing area 661R setting the entire right-side captured image 601R as a processing area includes discontinuous white broken-line road paint 643 and continuous white-line road paint 644. Therefore, it is possible to recognize that the vehicle is traveling in the second lane from the right.

In other words, when the traveling lane recognition process relating to the present invention is performed, it is possible to expand the processing area in the captured image depending on the traveling state, thereby allowing the traveling lane to be recognized, even on the road including equal to or more than four lanes each way.

Figure 13:
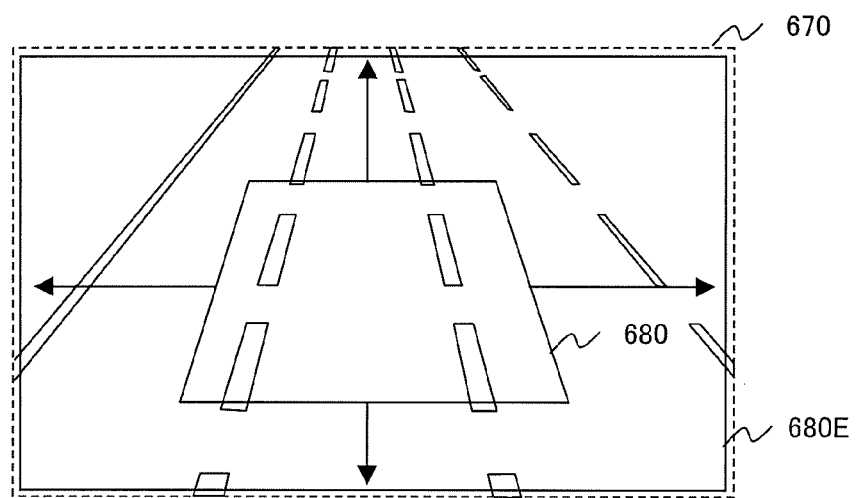
FIG. 13 illustrates an example how a processing area is expanded.

FIG. 13 illustrates the case where the sensor controller 200 relating to the present invention expands the processing area, with regard to the camera for capturing the front side of the vehicle, in the step S006. In the entire image 670 captured by the camera, the processing area setter 225 expands a normal image processing area 680 according to the sensor controller 200 relating to the present invention, to the image processing area 680E after the expansion.

With this configuration, the camera for capturing the front is also allowed to expand the processing area according to the traveling lane recognition process relating to the present invention, thereby achieving smooth recognition of the lane.

<Parking Support Process>

Figure 14:
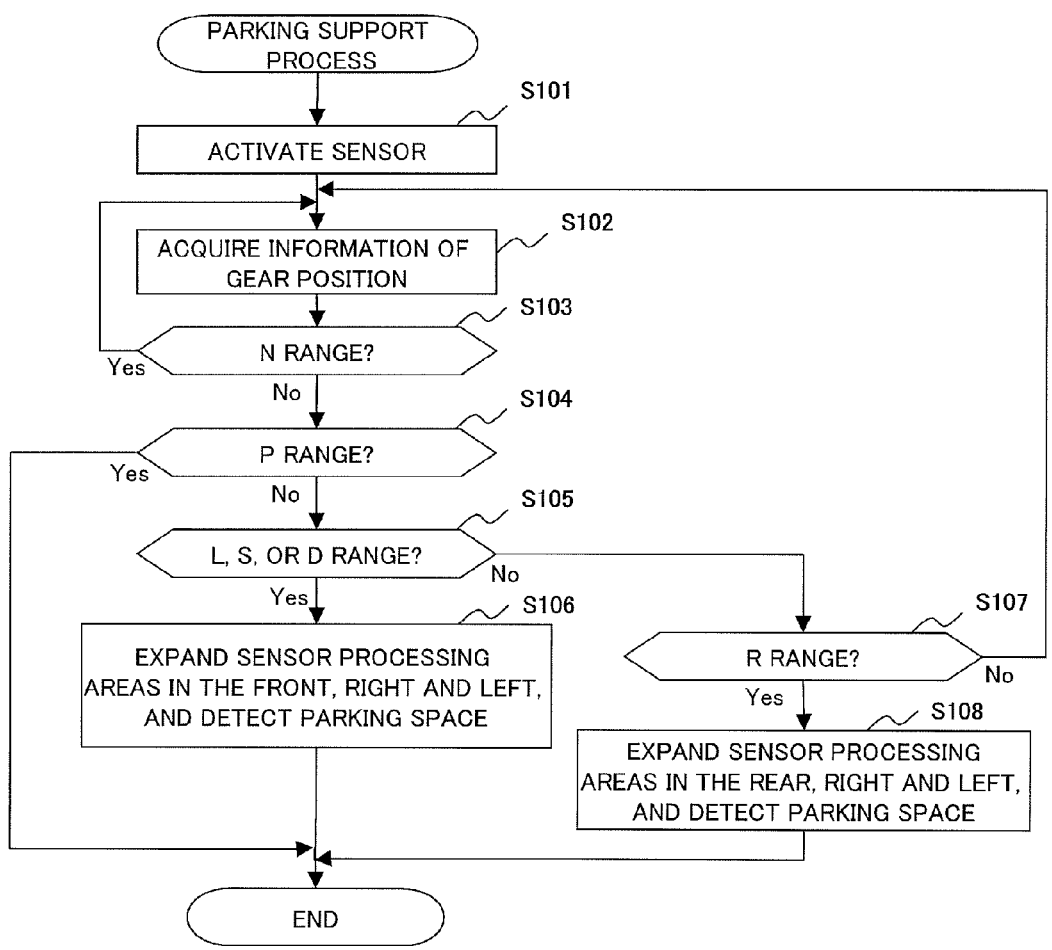
FIG. 14 is a flow diagram showing a parking support process.

Next, with reference to FIG. 14 and FIGS. 15A and 15B, an embodiment of the present invention will be explained, with regard to a parking support process in a parking area. It is to be noted that the configuration of the sensor control system in the present embodiment is the same as that of the sensor control system relating to the aforementioned traveling lane recognition process. Therefore, its explanation will not be made tediously.

The parking support process starts when a vehicle equipped with the sensor control system enters the parking area.

Firstly, the traveling state grasping part 222 of the sensor controller 200 activates the sensor 300, after setting the processing area to be normal (step S101).

Next, the traveling state grasping part 222 acquires information of a gear position (step S102). Specifically, the traveling state grasping part 222 requests the vehicle information acquisition unit 400 to provide the gear position information being currently set, and the vehicle information acquisition unit 400 transmits information specifying the gear position to the sensor controller 200.

Next, the traveling state grasping part 222 determines whether or not the gear position being acquired indicates the N (neutral) range, i.e., the gear is positioned at the neutral position (step S103).

If the gear position indicates the N range ("Yes" in the step S103), the traveling state grasping part 222 returns the processing to the step S102.

If the gear position does not indicate the N range ("No" in the step S103), the traveling state grasping part 222 determines whether or not the gear position indicates the P (park) range (step S104).

If the gear position indicates the P range ("Yes" in step S104), the traveling state grasping part 222 terminates the parking support process.

If the gear position does not indicate the P range ("No" in step S104), the traveling state grasping part 222 determines whether or not the gear position indicates the L (low) range, the S (second range), or the D (drive) range (step 105).

In the case where the gear position indicates the L range, the S range, or the D range ("Yes" in step S105), the processing area setter 225 sets a sensor area as the processing areas in the front, left, and right of the vehicle, expanding those areas larger than usual, and the recognition processor 226 performs detection of the parking space, and the like (step S106). Then, the recognition processor 226 terminates the parking support process.

If the gear position indicates none of the L range, the S range, and the D range ("No" in the step S105), the traveling state grasping part 222 determines whether or not the gear position indicates the R (reverse) range (step S107).

If the gear position does not indicate the R range ("No" in the step S107), the traveling state grasping part 222 returns the process to the step S102.

If the gear position indicates the R range ("Yes" in the step S107), the processing area setter 225 expands the rear, left, and right sensor processing areas, larger than usual, and the recognition processor 226 performs the detection of the parking space, and the like (step S108). Then, the recognition processor 226 terminates the parking support process.

Details of the parking support process has been explained so far.

According to the parking support process relating to the present invention, the user is allowed to detect the parking space in the area wider than the normal processing area.

It is to be noted that the processing area of the rear sensor may be reduced smaller than usual along with the processing in the step S106. With this configuration, it is possible to reduce the processing load relating to the parking support process. It is a matter of course that a similar effect can be obtained, by setting the processing area of the front sensor to be reduced smaller than usual in the step S108.

Figure 15A:
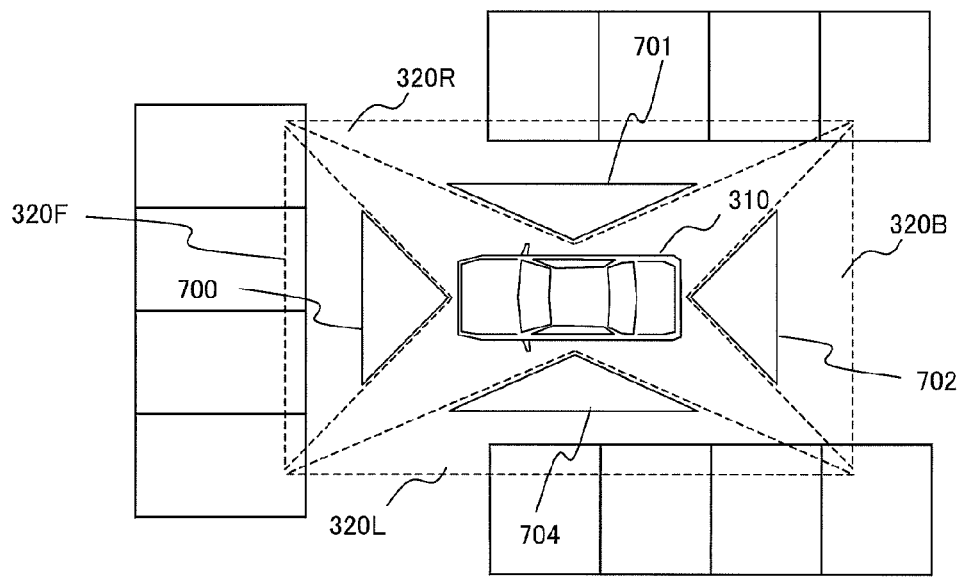
FIGS. 15A and 15B illustrate an example how the processing area is expanded in the parking support process.
Figure 15B:
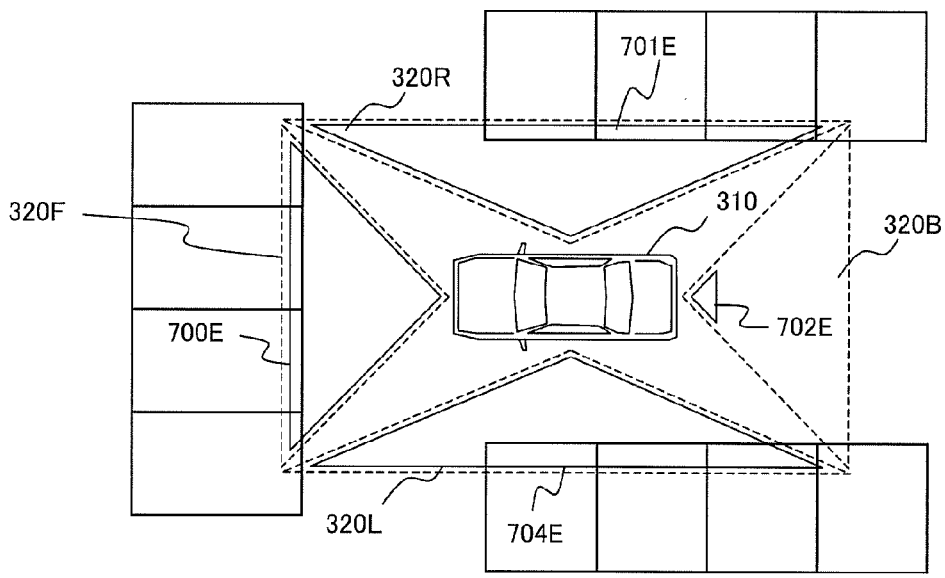

Each of FIGS. 15A and 15B illustrates a comparative example of the present invention. FIG. 15A illustrates a result of the parking space detection according to the control system which detects the parking space without using the parking support process according to the present invention, and FIG. 15B illustrates a result of the parking space detection according to the control system which detects the parking space with the use of the parking support process.

In FIG. 15A, the front imaging area according to the camera mounted on the vehicle 310 is indicated by the reference numeral 320F, and the processing area 700 is set as a area to be processed. The right imaging area is indicated by the reference numeral 320R, and the processing area 701 is set as an area to be processed. The rear imaging area is indicated by the reference numeral 320B, and the processing area 702 is set as an area to be processed. The left imaging area is indicated by the reference numeral 320L, and the processing area 704 is set as an area to be processed.

In FIG. 15A, though any of the imaging areas, the front, rear, left, and right include the parking space, the parking space is not successfully found, since the processing areas are not sufficiently large.

On the other hand, in FIG. 15B, the front processing area 700E expands to the entire front imaging area 320F, the right processing area 701E expands to the entire right imaging area 320R, and the left processing area 704E expands to the entire left imaging area 320L. Therefore, the parking space is found in any of the directions, the front, right, and left. In addition, since the rear processing area 702E is made smaller than the normal processing area, it is possible to reduce the processing load.

The embodiment of the parking support process of the present invention has been explained so far.

According to the present embodiment, in the parking area, it is possible to change the sensor detection area used in the parking support process, depending on the gear position, and therefore, the sensor can be utilized more efficiently.

<Process at Intersection>

Figure 16:
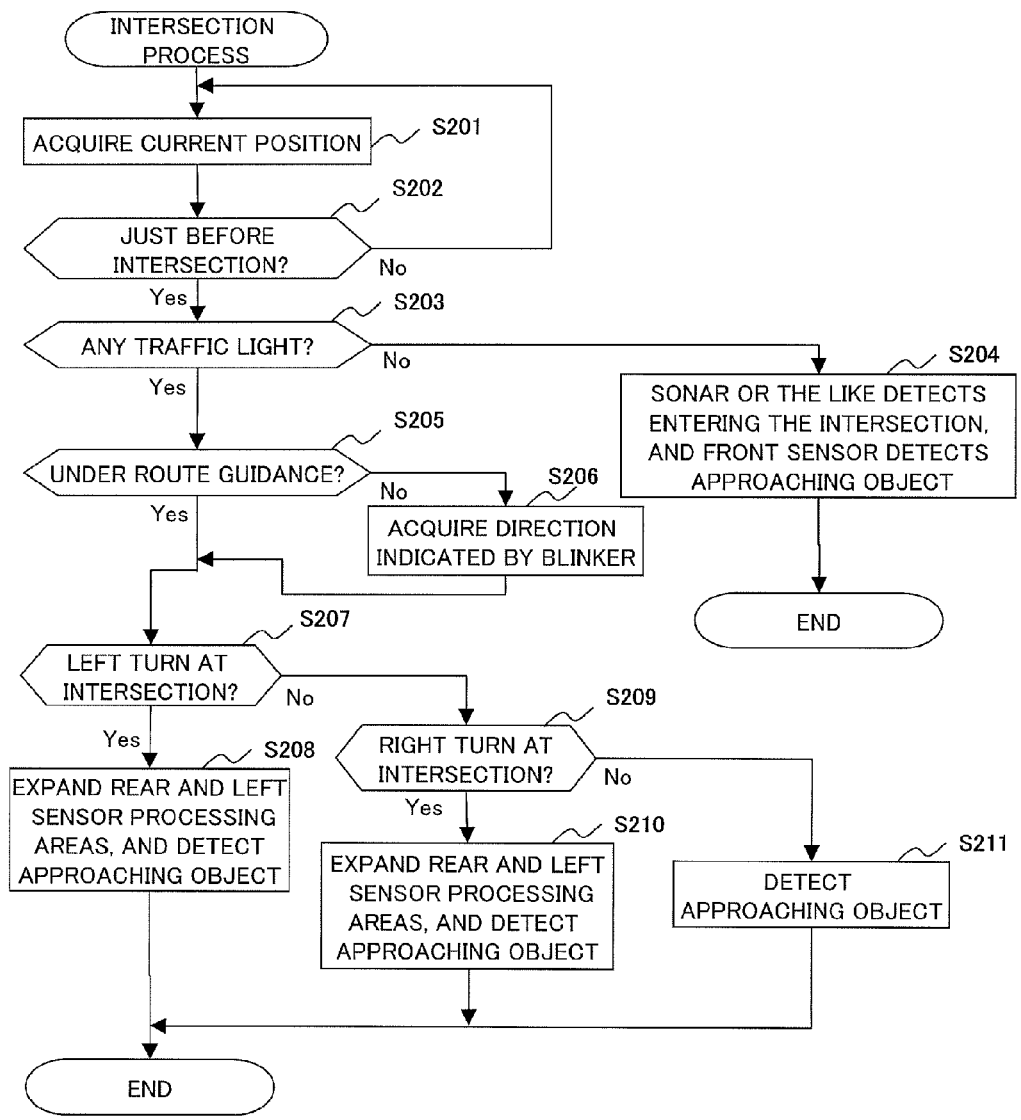
FIG. 16 is a flow diagram showing a process at an intersection.

Next, with reference to FIG. 16, one embodiment of the present invention will be explained, with regard to a process at an intersection (intersection process). It is to be noted that the configuration of the sensor control system in the present embodiment is the same as that of the sensor control system relating to the aforementioned traveling lane recognition process. Therefore, its explanation will not be made tediously.

The intersection process is started at regular intervals after the sensor control system is activated.

Firstly, the traveling state grasping part 222 of the sensor controller 200 acquires the current position (step S201). Specifically, the traveling state grasping part 222 requests the navigation device 100 to provide the information of current position. The current position calculation part 104 of the navigation device 110 calculates the current position, and transmits information specifying the current position to the sensor controller 200.

Next, the traveling state grasping part 222 determines whether or not the current position is just before a crossing point (step S202). Specifically, the traveling state grasping part 222 determines whether or not the current position acquired in the step S201 is included in the area a predetermined distance (e.g., 200 m) before the closest intersection that exists ahead in the traveling direction. If it is included, the current position is determined to be just before the intersection, and if not included, it is determined that the current position is not just before the intersection.

If the current position is not just before the intersection ("No" in the step S202), the traveling state grasping part 222 returns the process to the step S201.

If the current position is just before the intersection ("Yes" in the step S202), the traveling state grasping part 222 determines whether or not there is a traffic light at the intersection (step S203).

If there is not a traffic light at the intersection ("No" in the step S203), the recognition processor 226 detects entering the intersection by using sonar or the like, and detects an object approaching from the front side by using the front sensor, e.g., the front camera, or the like (step S204). Then, the recognition processor terminates the intersection process.

Specifically, the recognition processor 226 activates the sonar on the front, left, and right of the vehicle to measure a distance from the sonar to any obstruction on the side. Upon detection of disappearance of the obstruction within a predetermined distance, the recognition processor determines that the vehicle has entered the intersection. When the entering the intersection is detected, the recognition processor 226 activates the front camera. When a moving object on the front captured by the camera is detected and there is an approaching object, the recognition processor notifies the navigation device 100 of this approach. Then, the main controller 101 of the navigation device 100 performs a screen displaying process and an audio outputting process, such as issuing an alert to the user.

If there is a traffic light at the intersection ("Yes" in the step S203), the traveling state grasping part 222 determines whether or not the navigation device 100 is currently conducting route guidance (step S205).

Specifically, the traveling state grasping part 222 inquires the navigation device 100 whether or not a recommended route is set. The main controller 101 of the navigation device 100 inquires the route guiding part 106 whether or not a recommended route is set, and transmits a result (recommended route information, if the recommended route is set), to the sensor controller 200. The traveling state grasping part 222 accepts the result being transmitted, and determines that the route guidance is now conducted if there is a setting of the recommended route, and the route guidance is not conducted if there is no recommended route being set.

If the route guidance is not conducted ("No" in the step S205), the traveling state grasping part 222 acquires a direction indicated by the direction indicator (step S206). Then, the process of the traveling state grasping part proceeds to the step S207.

Specifically, the traveling state grasping part 222 inquires the vehicle information acquisition unit 400 about the direction indicated by the direction indicator. The vehicle information acquisition unit 400 detects the information of the indicated direction from the direction indicator 413, and transmits the information to the sensor controller 200. Then, the traveling state grasping part 222 accepts the indicated direction being transmitted.

If the route guidance is currently conducted ("Yes" in the step S205), or if the direction indicated by the direction indicator is acquired (in the case where the process in the step S206 is performed), the traveling state grasping part 222 determines whether or not a left turn is intended at the intersection (step S207).

Specifically, the traveling state grasping part 222 determines whether or not the left turn is intended at the intersection on the recommended route. Alternatively, if there is no recommended route, it is determined whether or not the direction indicated by the direction indicator specifies the left turn.

If the left turn is intended ("Yes" in the step S207), the recognition processor 226 expands the processing regions of the rear-side sensor and the left-side sensor to areas larger than usual, and detects an approaching object (step S208). Then, the intersection process is terminated.

Specifically, the processing area setter 225 sets as the processing regions, the entire imaging areas, for instance, of both the camera for imaging the rear side and the camera for imaging the left side. Then, the recognition processor 226 activates the camera for imaging the rear side and the camera for imaging the left side, to detect a moving object in the rear side and in the left side captured by the cameras. If there is any approaching object, the recognition processor 226 informs the navigation device 100 of the approaching object. Thereafter, the main controller 101 of the navigation device 100 performs the screen displaying process and the audio outputting process such as issuing an alert to the user.

If the left turn is not intended ("No" in the step S207), the traveling state grasping part 222 determines whether or not a right turn is intended at the intersection (step S209).

Specifically, the traveling state grasping part 222 determines whether or not the right turn is intended at the intersection on the recommended route. Alternatively, if there is no recommended route, it is determined whether or not the direction indicated by the direction indicator specifies the right turn.

If the right turn is intended ("Yes" in the step S209), the recognition processor 226 expands the processing regions of the rear-side sensor and the right-side sensor to areas larger than usual, and detects an approaching object (step S210). Then, the intersection process is terminated.

Specifically, the processing area setter 225 sets as the processing regions, the entire imaging areas, for instance, of both the camera for imaging the rear side and the camera for imaging the right side. Then, the recognition processor 226 activates the camera for imaging the rear side and the camera for imaging the right side, to detect a moving object in the rear side and in the right side imaged by the cameras. If there is any approaching object, the recognition processor informs the navigation device 100 of the approaching object. Thereafter, the main controller 101 of the navigation device 100 performs the screen displaying process and the audio outputting process, such as issuing an alert to the user.

If the right turn is not intended ("No" in the step S209), the recognition processor 226 sets the sensor processing regions in all the directions as per normal, and detects an approaching object (step S211). Then, the intersection process is terminated.

Specifically, the processing area setter 225 sets as the processing regions, portions of the imaging areas according to the cameras respectively for imaging the directions; front, rear, left, and right, for instance. Then, the recognition processor 226 activates the cameras for imaging the respective directions; front, rear, left, and right, detects a moving object within the processing areas of the images captured by the cameras, and informs the navigation device 100 of the approaching object, if any. Thereafter, the main controller 101 of the navigation device 100 performs the screen displaying process and the audio outputting process, such as issuing an alert to the user.

A detailed description of the intersection process has been explained so far.

According to the intersection process relating to the present invention, the user is allowed to set a direction being focused enough for detecting an approaching object, depending on the traveling direction at the intersection, upon passing through the intersection.

In the step S208, it is additionally possible to set the processing areas of the camera for imaging the front side and the camera for imaging the right side to be reduced, smaller than usual. With this configuration, it is possible to suppress the processing load relating to the intersection process. It is a matter of course that a similar effect can be obtained, by setting the processing areas of the camera for imaging the front side and the camera for imaging the left side to be reduced smaller than usual in the step S210.

The embodiment of the intersection process according to the present invention has been explained so far.

With the present embodiment, it is possible to expand the detection area of the sensor in the direction to be paid cautions for the safety purpose at the intersection, depending on the traveling direction, thereby achieving more efficient usage of the sensor.

<Process on Narrow Road>

Figure 17:
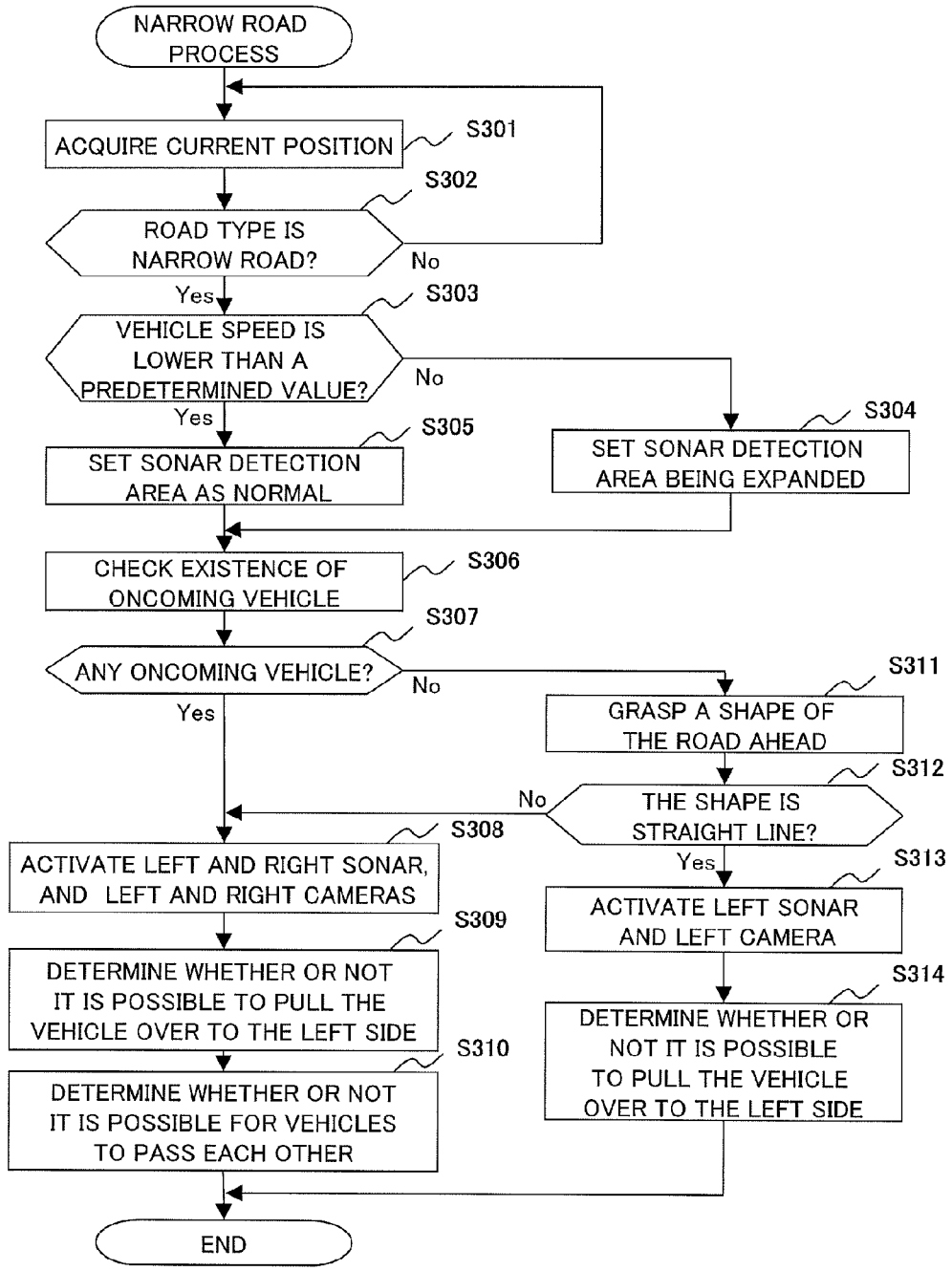
FIG. 17 is a flow diagram showing a process on a narrow road.

Next, with reference to FIG. 17, one embodiment of the present invention will be explained, regarding a process on a narrow road (narrow road process). It is to be noted that the configuration of the sensor control system in the present embodiment is the same as that of the sensor control system relating to the aforementioned traveling lane recognition process. Therefore, its explanation will not be made tediously.

The narrow road process is started at regular intervals when the sensor control system is activated.

Firstly, the traveling state grasping part 222 of the sensor controller 200 acquires the current position (step S301). Specifically, the traveling state grasping part 222 requests the navigation device 100 to provide information of the current position. The current position calculation part 104 of the navigation device 100 calculates the current position, and transmits to the sensor controller 200, the information specifying the current position.

Next, the traveling state grasping part 222 determines whether or not the current position is on a narrow road (step S302).

Specifically, the traveling state grasping part 222 inquires the navigation device 100 about a road type of a link corresponding to the road to which the current position acquired in the step S301 belongs. The main controller 101 of the navigation device 100 specifies link data 152 of the link to which the current position belongs, and transmits the information of the road type 173. The traveling state grasping part 222 determines whether or not the road is a narrow road, depending on whether or not the information of the road type 173 is a narrow road.

If the current position is not on the narrow road ("No" in the step S302), the traveling state grasping part 222 returns the process to the step S301.

If the current position is on the narrow road ("Yes" in the step S302), the traveling state grasping part 222 determines whether or not the vehicle speed is lower than a predetermined value (step S303).

Specifically, the traveling state grasping part 222 inquires the vehicle information acquisition unit 400 about the vehicle speed. The vehicle information acquisition unit 400 transmits to the sensor controller, the vehicle speed acquired by the vehicle speed sensor 411. The traveling state grasping part 222 determines whether or not the vehicle speed being transmitted is lower than a predetermined value (e.g., 15 km per hour).

If the vehicle speed is not lower than the predetermined value ("No" in the step S303), the sonar controller 224 sets the sonar detection area to be expanded larger than usual (step S304). Then, the process proceeds to the step S306.

If the vehicle speed is lower than the predetermined value ("Yes" in the step S303), the sonar controller 224 sets the sonar detection area to be the normal area (step S305). Then, the process proceeds to the step S306.

Next, the traveling state grasping part 222 checks existence of a vehicle coming from the opposite direction (an oncoming vehicle) (step S306). Specifically, the traveling state grasping part 222 establishes vehicle-to-vehicle communication (direct communication between vehicles) or road-to-vehicle communication (communication via an information center, or the like), and acquires information indicating whether an oncoming vehicle exists within a predetermined distance (e.g., within 200 m). It is a matter of course that the communication unit 11 may be used to receive information as to the existence of the oncoming vehicle, from an information center, or the like located outside.

Next, the traveling state grasping part 222 determines whether or not the oncoming vehicle is approaching a (step S307). Specifically, the traveling state grasping part 222 determines whether or not the oncoming vehicle is approaching according to the information acquired in the step S306. Alternatively, various sensors (camera, radar, sonar, and the like) mounted on the self vehicle may be used for determining whether or not the oncoming vehicle is approaching.

If the oncoming vehicle is approaching ("Yes" in the step S307), the camera controller 223 and the sonar controller 224 respectively activate, the cameras for imaging the left side and the right side, and the sonar for detecting the left side and the right side (step S308).

Next, the recognition processor 225 determines whether or not it is possible to pull the vehicle over to the left side (step S309). Specifically, the recognition processor 225 specifies a width on the left side based on the information of the sonar for detecting the left side and the information of the camera for imaging the left side. When the width becomes equal to or less than a predetermined value (e.g., 10 cm), the navigation device 100 is notified of this situation. Then, the main controller 101 of the navigation device 100 performs the screen displaying process and the audio outputting process, such as issuing an alert to the user.

Next, the recognition processor 225 determines whether or not vehicles are passable each other (step S310). Then, the recognition processor terminates the narrow road process.

Specifically, the recognition processor 225 specifies a width from the right side, i.e., a width from the oncoming vehicle, based on the information of the sonar for detecting the right side and the camera for imaging the right side, and when the width becomes equal to or less than a predetermined value (e.g., 10 cm), the navigation device 100 is notified of this situation. Then, the main controller 101 of the navigation device 100 performs the screen displaying process and the audio outputting process, such as issuing an alert to the user.

If there is no oncoming vehicle ("No" in the step S307), the traveling state grasping part 222 grasps a shape of the road ahead (step S311). Specifically, the traveling state grasping part 222 inquires the navigation device 100 about whether or not the shape of the road within a predetermined distance (e.g., 100 m) ahead the current position is a straight line.

The route guiding part 106 or the main controller 101 of the navigation device 100 determines whether or not the shape of the road existing ahead the current position is a straight line, based on the link direction of the link data, and transmits the determination result to the sensor controller 200. In this determination, if a recommended route is currently set, for instance, the route guiding part 106 determines that the road is a straight road in the case where a difference in connection angles between links is less than five degrees, as to the links within a predetermined distance out of the links constituting the recommended route. Furthermore, for example, if any recommended route is not set, the main controller 101 determines that the road is a straight road, in the case where a difference in connection angles between links is less than five degrees, as to the links within a predetermined distance, out of the links being connected without necessity of a right turn or a left turn from the current position.

Next, the traveling state grasping part 222 determines whether or not the shape of the road ahead is a straight line (step S312). Specifically, if the navigation device 100 determines that the shape of the road acquired in the step S311 is a "straight line", the traveling state grasping part 222 determines that it is a straight line, and if the navigation device 100 determines that it is not a straight line, the traveling state grasping part 222 determines that it is not a straight line.

If it is not a straight line ("No" in the step S312), the process of the traveling state grasping part 222 proceeds to the step S308.

If it is a straight line ("Yes" in step S312), the camera controller 223 and the sonar controller 224 activate respectively, the camera for imaging the left side and the sonar for imaging the left side (step S313).

Next, the recognition processor 225 determines whether or not it is possible to pull the vehicle over to the left side (step S314). Then, the recognition processor terminates the narrow road process.

Specifically, the recognition processor 225 specifies a width on the left side based on the information of the sonar for detecting the left side and the information of the camera for imaging the left side. When the width becomes equal to or less than a predetermined value (e.g., 10 cm), the navigation device 100 is notified of this situation. Then, the main controller 101 of the navigation device 100 performs the screen displaying process and the audio outputting process, such as issuing an alert to the user.

A detailed description of the narrow road process has been explained so far.

According to the narrow road process relating to the present invention, upon traveling on a narrow road, the user is allowed to set a direction focused enough for detecting an approaching object, depending on a traffic state on the narrow road.

The embodiment of the narrow road process relating to the present invention has been described.

With the present embodiment, it is possible to activate the sensor detection area in the direction to be paid cautions for the safety purpose on the narrow road, depending on the traffic state, thereby achieving more efficient usage of the sensor.

Figure 18:
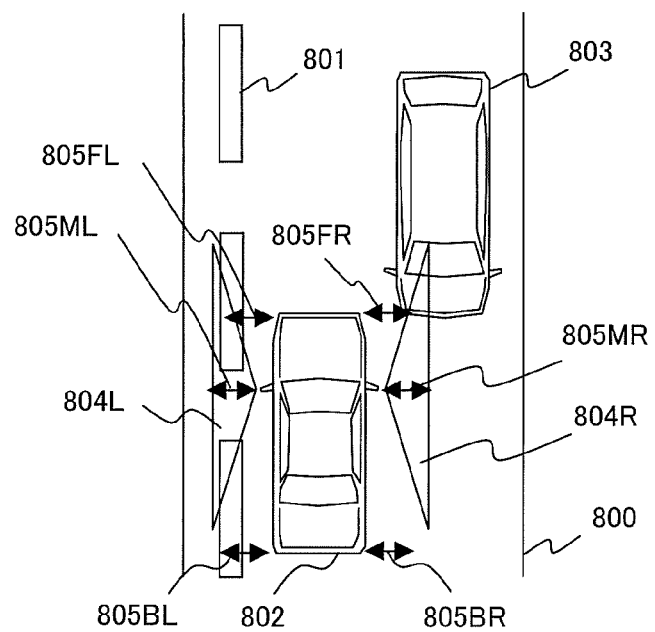
FIG. 18 illustrates an example of the processing area in the process on the narrow road.

FIG. 18 illustrates a processing status on the narrow road, according to the control system for detecting a width between a vehicle and another vehicle coming from the opposite direction, and a width between the vehicle and the left road edge, using the narrow road process relating to the present invention. FIG. 18 illustrates the state that the vehicle 802 and the oncoming vehicle 803 traveling on the narrow road 800 pass each other, the vehicle 802 being equipped with the sensor control system for performing the narrow road process relating to the present invention. A sidewalk is provided on the left edge of the narrow road 800, and there are curbstones 801 between the sidewalk and the street. Therefore, it is necessary for the vehicle 802 to travel between the curbstones 801 and the oncoming vehicle 803, without being brought into contact with any of them.

Under this circumstance, the left and right sonar and the left and right cameras are activated in the step S308 of the narrow road process.

As shown in FIG. 18, the activated cameras for imaging left and right are installed in such a manner that the both sides of the vehicle 802 are captured. The camera for imaging the left side captures an image of the left-side state of the vehicle, including the curbstones 801, based on the left-side camera imaging area 804L. The camera for imaging the right side captures an image of the right-side state of the vehicle, including the oncoming vehicle 803, based on the right-side camera imaging area 804R.

As shown in FIG. 18, the sonar being activated for detecting the left side is installed on the front side, near the side mirror, and the rear side of the vehicle 802 in such a manner that the sonar detects the distance from the side surface of the vehicle. The sonar detects an approach of an obstruction, for instance, an approach of a wall, respectively based on the front left-side sonar detection area 805FL, the middle left-side sonar detection area 805ML, and the rear left-side sonar detection area 805BL.

Similarly, the sonar being activated for detecting the right side is installed on the front side, near the side mirror, and the rear side of the vehicle 802 in such a manner that the sonar detects the distance from the side surface of the vehicle. The sonar detects an approach of an obstruction, for instance, an oncoming vehicle or a wall, respectively based on the front right-side sonar detection area 805FR, the middle right-side sonar detection area 805MR, and the rear right-side sonar detection area 805BR.

As thus described, since both the left and right sonar and the left and right cameras are activated in the step S308, the sensor controller is allowed to determine whether or not it is possible to pull the vehicle over to the left side, according to the camera for imaging the left side and the sonar for detecting the left side (step S309), and determine whether or not it is possible for vehicles to pass each other according to the camera for imaging the right side and the sonar for detecting the right side (step S310).

<Lane Change Process>

Figure 19:
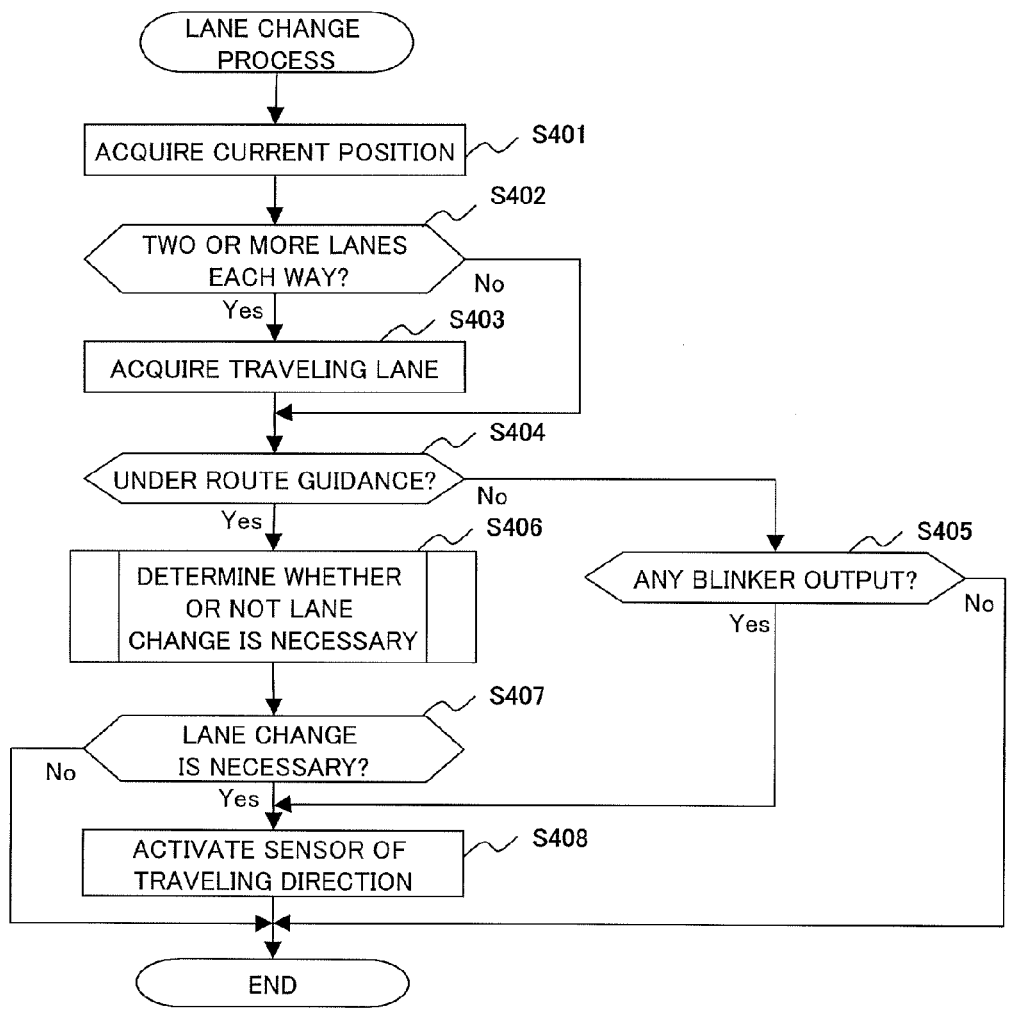
FIG. 19 is a flow diagram showing a lane change process.

Next, with reference to FIG. 19, one embodiment of the present invention will be explained, with regard to the lane change process for controlling the operation of each sensor 300, upon changing lanes. It is to be noted that the configuration of the sensor control system in the present embodiment is the same as that of the sensor control system relating to the aforementioned traveling lane recognition process. Therefore, its explanation will not be made tediously.

The lane change process is started at regular intervals, when the sensor control system is activated.

Firstly, the traveling state grasping part 222 of the sensor controller 200 acquires the current position (step S401). Specifically, traveling state grasping part 222 requests the navigation device 100 to provide information of the current position. The current position calculation part 104 of the navigation device 110 calculates the current position and transmits to the sensor controller 200, the information specifying the current position.

Next, the traveling state grasping part 222 determines whether or not the road to which the current position belongs includes at least two lanes each way (step S402). Specifically, the traveling state grasping part 222 requests the navigation device 100 to provide information of the link to which the current position belongs. Then, the main controller 101 of the navigation device 100 acquires from the link data table 150, the link data 152 being the information as to the link to which the current position belongs, and transmits the link data to the sensor controller 200. The traveling state grasping part 222 reads the lane information 176 included in the link data 152 being transmitted, and determines whether or not the number of lanes each way is equal to or more than two.

If the number of lanes each way is not equal to or more than two ("No" in the step S402), the process of the traveling state grasping part 222 proceeds to the step S404.

If the number of lanes each way is equal to or more than two ("Yes" in the step S402), the traveling state grasping part 222 acquires the traveling lane (step S403).

Specifically, the processing area setter 225 of the sensor controller 200 sets the processing area as a normal area with regard to an image obtained by capturing the surroundings of the vehicle, e.g., the left and right ground surfaces. Then, the recognition processor 226 instructs the camera controller 223 to start imaging. The recognition processor 226 performs a white line recognition process in a predetermined area within the image corresponding to the normal processing area being set, out of the captured image, and specifies a traveling lane according to a white line pattern being recognized. Then, the traveling state grasping part 222 acquires the lane information specified by the recognition processor 226.

Next, the traveling state grasping part 222 determines whether or not the navigation device 100 is currently conducting route guidance (step S404). Specifically, the traveling state grasping part 222 inquires the navigation device 100 whether or not a recommended route is set. The main controller 101 of the navigation device 100 inquires whether or not the recommended route is set in the route guiding part 106, and transmits a result (recommended route information, if the recommended route is set), to the sensor controller 200. The traveling state grasping part 222 accepts the result being transmitted, and determines that the route guidance is currently conducted if there is a setting of the recommended route, and the route guidance is not conducted if no recommended route is set.

If the route guidance is not conducted ("No" in the step S404), the traveling state grasping part 222 acquires a direction indicated by the direction indicator, and determines whether there is an output of either left or right, or there is no output (step S405).

Specifically, the traveling state grasping part 222 inquires the vehicle information acquisition unit 400 about the direction indicated by the direction indicator. The vehicle information acquisition unit 400 detects the information of the indicated direction from the direction indicator 413, and transmits the information to the sensor controller 200. Then, the traveling state grasping part 222 accepts the indicated direction being transmitted, and determines whether the output is made, either left or right, or there is no output.

If there is an output from the direction indicator ("Yes" in the step S405), the process of the traveling state grasping part 222 proceeds to the step S408 described below.

If there is no output from the direction indicator ("No" in the step S405), the traveling state grasping part 222 terminates the lane change process.

If the route guidance is currently conducted ("Yes" in the step S404), the traveling state grasping part 222 performs a process for determining necessity of lane change as described below, and acquires a result regarding whether or not the lane change is necessary, and the direction thereof (step S406).

Next, the traveling state grasping part 222 determines whether or not the lane change is necessary according to the result of the step S406 (step S407).

If the lane change is not necessary ("No" in the step S407), the traveling state grasping part 222 terminates the lane change process.

If the lane change is necessary ("Yes" in the step S407), the recognition processor 226 activates the sensor 300 according to the traveling direction, and performs the recognition process (step S408).

Specifically, the processing area setter 225 sets the normal processing area, instructs the camera controller 223 and the sonar controller 224 to activate the sensors 300, assuming as a detection target, the direction of the lane change specified in the step S406, or the direction outputted from the direction indicator in the step S405. Then, the recognition processor 226 acquires the information from the sensor being activated and conducts a process such as detection of an approaching object.

A detailed description of the lane change process has been explained so far.

Figure 20:
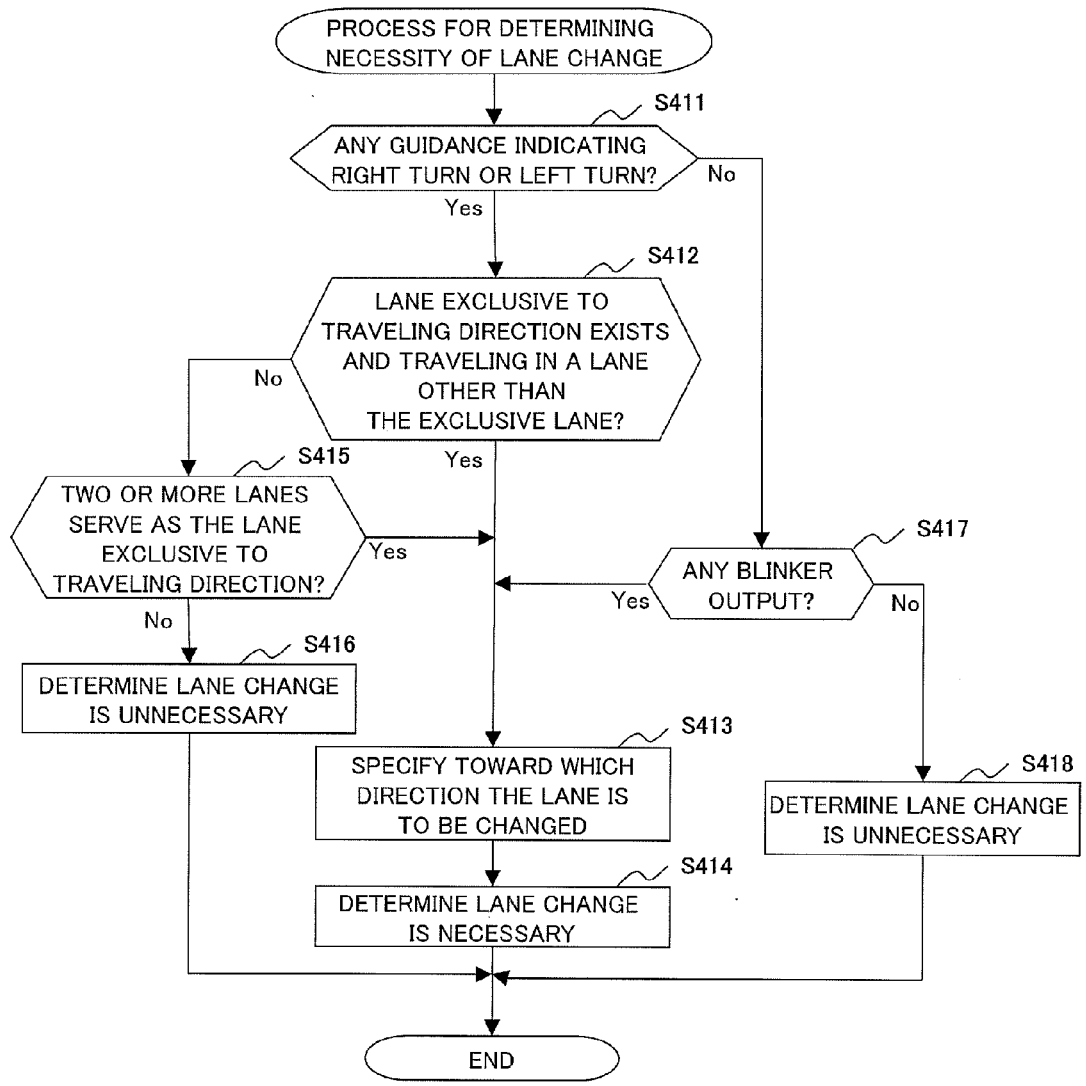
FIG. 20 is a flow diagram showing a process for determining necessity of the lane change in the lane change process.

FIG. 20 illustrates a flow of the process for determining necessity of lane change, performed in the step S406 of the lane change process.

Firstly, the traveling state grasping part 222 determines whether or not there is guidance to make a right turn or a left turn (step S411). Specifically, the traveling state grasping part 222 inquires the navigation device 100 whether or not route guidance is provided to make either a right turn or a left turn. The main controller 101 of the navigation device 100 determines whether or not the route guiding part 106 provides guidance to make a right turn or a left turn. If such guidance is provided, the main controller 101 of the navigation device 100 transmits to the sensor controller 200, a direction indicated in the guidance, i.e., information specifying a right turn or a left turn. The traveling state grasping part 222 accepts a result being transmitted, and if the result specifies a right turn or a left turn, the traveling state grasping part determines that there is guidance, whereas if not, it is determined that there is no guidance.

In the case where there is guidance indicating a right turn or a left turn ("Yes" in step S411), the traveling state grasping part 222 determines whether or not there is a lane exclusive to the traveling direction on a road to which the current position belongs, and whether or not the self vehicle is traveling in a lane other than the exclusive lane (step S412).

Specifically, the traveling state grasping part 222 determines whether or not the lane information 176 acquired in the step S402 includes a lane exclusive to the traveling direction for turning to either left or right, being specified in the step S411, and whether or not the traveling lane acquired in the step S403 corresponds to a lane other than the exclusive lane.

If the road to which the current position belongs includes the lane exclusive to the traveling direction, and the self vehicle is traveling in a lane other than the exclusive lane ("Yes" in the step S412), the traveling state grasping part 222 specifies a direction for changing lanes (step S413).

Specifically, the traveling state grasping part 222 identifies as the direction for changing lanes, either of the right turn and the left turn which is specified in the step S411.

Next, the traveling state grasping part 222 determines that it is necessary to change lanes (step S414). Then, the traveling state grasping part 222 terminates the process for determining necessity of lane change, and the process proceeds to the step s407.

If there is no lane exclusive to the traveling direction on the road to which the current position belongs, or there is a lane exclusive to the traveling direction and the self vehicle is traveling in that lane ("No" in the step S412), the traveling state grasping part 222 determines whether or not the number of the lanes exclusive to the traveling direction is equal to or more than two (step S415).

If the number of the lanes exclusive to the traveling direction is not equal to or more than two ("No" in the step S415), the traveling state grasping part 222 determines that it is not necessary to change lanes (step S416). Then, the traveling state grasping part 222 terminates the process for determining necessity of lane change, and the process proceeds to the step S407 of the lane change process.

If the number of lanes exclusive to the traveling direction is equal to or more than two ("Yes" in the step S415), the process of the traveling state grasping part 222 proceeds to the step S413.

If there is no guidance for making a right turn or a left turn ("No" in the step S411), the traveling state grasping part 222 acquires a direction indicated by the direction indicator, and determines whether or not there is any output indicating left or right (step S417).

Specifically, the traveling state grasping part 222 inquires the vehicle information acquisition unit 400 which direction is indicated by the direction indicator. The vehicle information acquisition unit 400 detects information of the indicated direction from the direction indicator 413, and the transmits the information to the sensor controller 200. Then, the traveling state grasping part 222 accepts the indicated direction being transmitted, and determines which direction the output indicates, left or right.

If there is an output from the direction indicator ("Yes" in the step S417), the process of the traveling state grasping part 222 proceeds to the step S413 described above.

If there is no output from the direction indicator ("No" in the step S417), the traveling state grasping part 222 determines that the lane change is not necessary (step S418). Then, the traveling state grasping part 222 terminates the process for determining necessity of lane change, and the process proceeds to the step S407 of the lane change process.

So far, an example of the flow of the process for determining necessity of lane change has been described, the process being performed in the step S406 of the lane change process.

According to the lane change process relating to the present invention, upon changing lanes, the user is allowed to set a direction focused enough for detecting an approaching object, depending on the direction to which the lane is to be changed.

The embodiment of the lane change process relating to the present invention has been described so far.

With the present embodiment, it is possible to activate the sensors, being limited to the minimum according to the lane change direction, thereby achieving more efficient usage of the sensors.

<Process for Road Divider>

Figure 21:
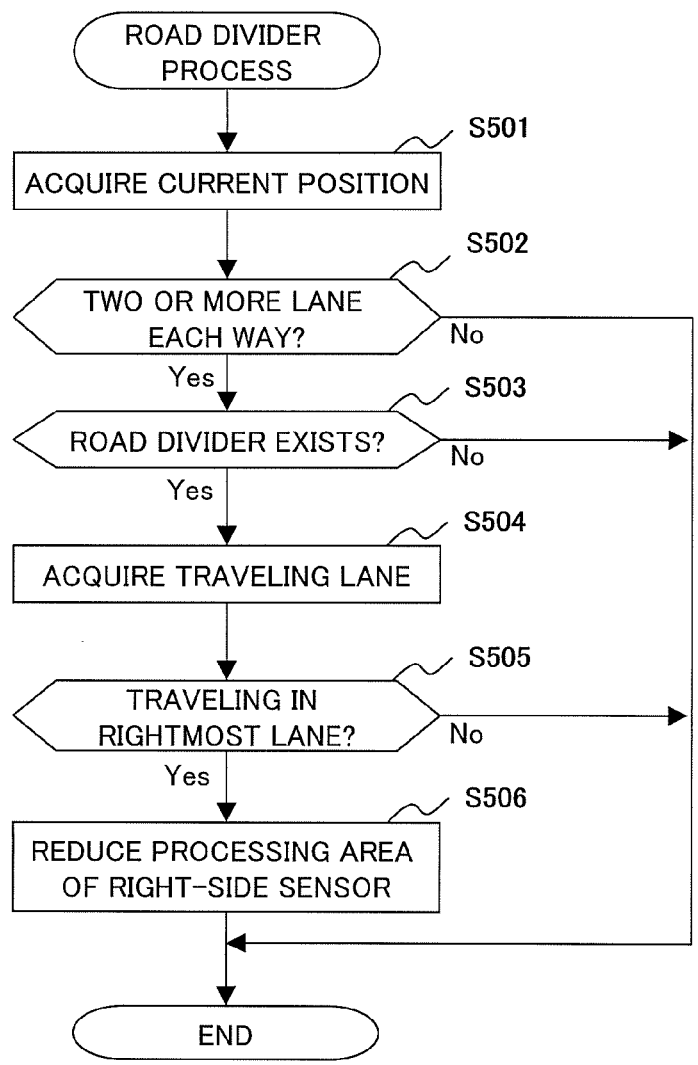
FIG. 21 is a flow diagram showing a process for road divider.

Next, with reference to FIG. 21, an embodiment of the present invention will be explained, with regard to the process for a road divider (road divider process), for controlling the operation of each sensor 300, upon traveling along the road divider (median strip). It is to be noted that the configuration of the sensor control system in the present embodiment is the same as that of the sensor control system relating to the aforementioned traveling lane recognition process. Therefore, its explanation will not be made tediously.

The road divider process is started at regular intervals when the sensor control system is activated.

Firstly, the traveling state grasping part 222 of the sensor controller 200 acquires the current position (step S501). Specifically, the traveling state grasping part 222 requests the navigation device 100 to provide information of the current position. The current position calculation part 104 of the navigation device 100 calculates the current position, and transmits to the sensor controller 200, the information specifying the current position.

Next, the traveling state grasping part 222 determines whether or not the road to which the current position belongs includes at least two lanes each way (step S502). Specifically, the traveling state grasping part 222 requests the navigation device 100 to provide information of the link to which the current position belongs. Then, the main controller 101 of the navigation device 100 acquires from the link table 150, the link data 152 being the information regarding the link to which the current position belongs, and transmits the link data to the sensor controller 200. The traveling state grasping part 222 reads the lane information 176 included in the link data 152 being transmitted, and determines whether or not the number of lanes is equal to or more than two each way.

If the number of lanes is not equal to or more than two each way ("No" in the step S502), the traveling state grasping part 222 terminates the road divider process.

If the number of lanes is equal to or more than two each way ("Yes" in the step S502), the traveling state grasping part 222 determines whether or not the road to which the current position belongs has a road divider (step S503).

Specifically, the traveling state grasping part 222 reads a road type 173 included in the information of the link to which the current position belongs, obtained from the navigation device 100 in the step S502, determines that the road includes a road divider if the road includes up and down lines being separated, and if not, the road includes no road divider.

If the road does not include a road divider ("No" in the step S503), the traveling state grasping part 222 terminates the road divider process.

If the road includes a road divider ("Yes" in the step S503), the traveling state grasping part 222 acquires a traveling lane (step S504).

Specifically, the processing area setter 225 of the sensor controller 200 sets as the normal processing area, a processing area in the image capturing the surroundings of the vehicle, for example, the left and right ground surfaces. Then, the recognition processor 226 instructs the camera controller 223 to start imaging. The recognition processor 226 performs a white line recognition process on a predetermined area within the image corresponding to the normal processing area being set, and specifies a lane in which the vehicle is traveling, according to the white line pattern being recognized. Then, the traveling state grasping part 222 acquires information of the lane specified by the recognition processor 226.

Next, the traveling state grasping part 222 determines whether or not the information for specifying the traveling lane acquired in the step S504 indicates traveling in the rightmost lane (step S505).

If it does not indicate traveling in the rightmost lane ("No" in the step S505), the traveling state grasping part 222 terminates the road divider process.

If it indicates traveling in the rightmost lane ("Yes" in the step S505), the processing area setter 225 reduces the processing area smaller than usual, of the sensor which performs detection targeting the right side (step S506).

Specifically, the processing area setter 225 sets the processing area to be reduced smaller than usual, of the sensor which performs detection targeting the right side, for instance, sonar for detecting the right side and a camera for imaging the right side, and the recognition processor 226 performs the lane recognition, and the like, according to the processing area. Then, the recognition processor 226 terminates the road divider process.

A detailed description of the road divider process has been explained so far.

With the road divider process relating to the present invention, upon traveling in a lane along the road divider, the user is allowed to reduce the processing area recognized by the sensor in the direction of the road divider. Therefore, it becomes possible to suppress the processing load.

Figure 22:
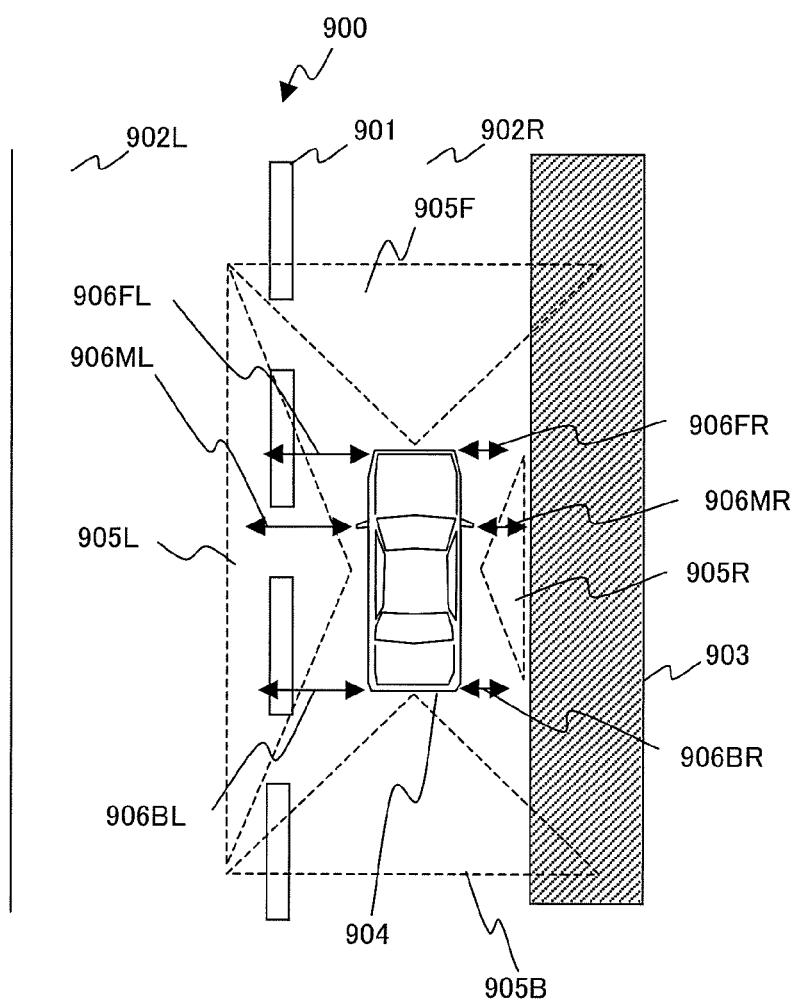
FIG. 22 illustrates an example of processing areas in the process for road divider.

FIG. 22 illustrates a processing state in the lane along the road divider, according to the sensor control system for detecting the surroundings of the vehicle, by using the road divider process relating to the present invention. FIG. 22 illustrates the state that the vehicle 904 traveling on the road 900, being equipped with the sensor control system which is able to perform the road divider process relating to the present invention, takes the lane 902R along the road divider 903.

The lane on the road 900 is divided into the left side lane 902L and the right side lane 902R by the lane boundary 901. The vehicle 904 is provided with cameras for imaging the front side, the right side, the rear side, and the left side, and left and right sonar for detecting a distance from an obstruction existing on the side of the front part, the side-mirror part, and the rear part of the vehicle.

It is to be noted that the front imaging area 905F, the right imaging area 905R, the rear imaging area 905B, and the left imaging area 905L represent respectively, the areas imaged by the cameras, on the front, right, rear, and left sides. In addition, the front right detection area 906FR, the side-mirror right side detection area 906MR, the rear right detection area 906BR, the front left detection area 906FL, the side-mirror left detection area 906ML, the rear left detection area 906BL represent respectively, the sides of the front part, the sides of the side-mirror part, the sides of the rear part, detected by the sonar.

In the step S506 of the road divider process, as a result of reducing the detection area of the sensors on the road divider 903 side, as illustrated, the imaging area of the right-side imaging area 905R is reduced smaller than the imaging areas in other directions, and the detection areas of the front right side detection area 906FR, the side-mirror right side detection area 906MR, and the rear right side detection area 906BR are reduced smaller than the detection areas of the associated detection areas of the sonar on the left side.

The embodiment of the road divider process relating to the present invention has been explained so far.

According to the present embodiment, on a road where a road divider is provided, if a vehicle is traveling in the lane along the road divider, it is possible to narrow down the detection area of the sensor on the road divider side, thereby allowing an efficient usage of the sensor.

The present invention is not limited to the aforementioned embodiments and examples. The embodiments described above may be modified variously within the scope of the technical idea of the present invention.

By way of example, in the aforementioned embodiments, the sensor 300 includes cameras and sonar, but it is not limited to this example. The sensor may include only either one of them, or it may additionally include radar such as a riser, or millimeter wave radar, and the like.

This configuration allows an appropriate use of those equipped sensors, depending on the sensors installed on the vehicle.

Further in the aforementioned embodiments and modified examples, for instance, the traveling lane recognition process, the parking support process, the intersection process, the narrow road process, the lane change process, and the road divider process may be implemented all in parallel. In that case, for example, there is a possibility that different processing areas may be set on the sensors, or different sensors may be activated, as the results of the traveling lane recognition process, the intersection process, the lane change process, and the road divider process. On this occasion, the processing areas of the sensors are adjusted to the maximum area, and a sensor being a target of any one of the processes may be selected as a sensor to be activated.

With this configuration, the sensor control system may support a driver with the use of all functions being required, without limiting any process by another process.

In addition, in the aforementioned embodiments and the modified examples, with regard to the narrow road process and the lane change process, the sensor is activated according to the traveling condition, but this is not the only example. By way of example, it is also possible to expand the processing area, or expand the processing area simultaneously with activating the sensor. In any of the embodiments, it is also possible to raise a task priority (expand an allocation of processing time by the CPU) for the recognition process according to the recognition processor 226.

With this configuration, if it is necessary to control the sensor, the sensor control system is allowed to use the sensor necessary at the minimum, and shorten the processing time required for information processing using the sensor. Therefore, this allows enhancement of processing responsiveness of the sensor controller.

Further in the aforementioned embodiments and the modified examples, with regard to the traveling lane recognition process, the intersection process, and the road divider process, the processing area is changed depending on the traveling condition. However, this is not the only example. Alternatively, the sensor may be activated, or the processing area may be expanded simultaneously with activating the sensor, for instance. In any of the embodiments above, it is also possible to raise a task priority (expand an allocation of processing time by the CPU) for the recognition process according to the recognition processor 226.

With this configuration, if it is necessary to control the sensor, the sensor control system is allowed to use the sensor necessary at the minimum, and shorten the processing time required for information processing using the sensor. Therefore, this allows enhancement of processing responsiveness of the sensor controller.

In the embodiments above, the sensor controller 200 is a device independent of the navigation device 100, the sensor 300, the vehicle information acquisition unit 400. However, this is not the only example. For example, the navigation device 100 may implement the same function as the sensor controller 200; the sensor 300 may implement the same function as the sensor controller 200; or the vehicle information acquisition unit 400 may implement the same function as the sensor controller 200.

EXPLANATION OF REFERENCES

1 . . . ARITHMETIC PROCESSING UNIT, 2 . . . DISPLAY, 3 . . . STORAGE UNIT, 4 . . . AUDIO INPUT-OUTPUT UNIT, 5 . . . INPUT UNIT, 6 . . . ROM UNIT, 7 . . . GPS RECEIVER, 8 . . . FM MULTIPLEX BROADCASTING RECEIVER, 9 . . . BEACON RECEIVER, 10 . . . COMMUNICATION I/F, 21 . . . CPU, 22 . . . RAM, 23 . . . ROM, 24 . . . I/F, 25 . . . BUS, 41 . . . MICROPHONE, 42 . . . SPEAKER, 51 . . . TOUCH PANEL, 52 . . . DIAL SWITCH, 100 . . . NAVIGATION DEVICE, 101 . . . MAIN CONTROLLER, 102 . . . INPUT ACCEPTING PART, 103 . . . OUTPUT PROCESSOR, 104 . . . CURRENT POSITION CALCULATION PART, 105 . . . ROUTE SEARCHING PART, 106 . . . ROUTE GUIDING PART, 150 . . . LINK TABLE, 200 . . . SENSOR CONTROLLER, 202 . . . CPU, 203 . . . RAM, 204 . . . ROM, 205 . . . I/F, 206 . . . BUS, 210 . . . COMMUNICATION I/F, 221 . . . MAIN CONTROLLER, 222 . . . TRAVELING STATE GRASPING PART, 223 . . . CAMERA CONTROLLER, 224 . . . SONAR CONTROLLER, 225 . . . PROCESSING AREA SETTER, 226 . . . RECOGNITION PROCESSOR 300 . . . SENSOR, 400 . . . VEHICLE INFORMATION ACQUISITION UNIT, 401 . . . ARITHMETIC PROCESSING UNIT, 402 . . . CPU, 403 . . . RAM, 404 . . . ROM, 405 . . . I/F, 411 . . . VEHICLE SPEED SENSOR, 412 . . . GYRO SENSOR, 413 . . . DIRECTION INDICATOR (BLINKER), 414 . . . GEAR POSITION SENSOR, 415 . . . COMMUNICATION I/F

What is claimed is:

1. A sensor controller being connected to a multiple sensor unit configured to detect information around a vehicle, the sensor controller comprising:
    a processor; and
    a memory storing computer readable instructions that, when executed by the processor, implement:
    a traveling state grasping unit configured to grasp a traveling state of the vehicle,
    a processing unit configured to perform a certain process on a predetermined area, within the information around the vehicle detected by the multiple sensor unit, and
    a processing portion changing unit configured to change the predetermined area to be processed by the processing unit, in accordance with the traveling state grasped by the traveling state grasping unit;
    wherein the processing portion changing unit selects one or more sensors to be activated, out of the multiple sensors of the multiple sensor unit, in accordance with the traveling state grasped by the traveling state grasping unit.

2. The sensor controller according to claim 1, wherein, the traveling state grasping unit specifies a number of lanes on a road where the vehicle is traveling, and the processing portion changing unit expands the predetermined area in accordance with the number of lanes.

3. The sensor controller according to claim 1, wherein, the traveling state grasping unit specifies a number of lanes on a road where the vehicle is traveling, and a lane where the vehicle is traveling, the processing portion changing unit expands the predetermined area in accordance with the number of lanes, when it is unclear in which lane the vehicle is traveling according to the traveling state grasping unit, and the processing unit performs a lane recognition process on the predetermined area being expanded.

4. The sensor controller according to claim 1, wherein, the traveling state grasping unit specifies a gear position of the vehicle, and the processing portion changing unit expands the predetermined area, with regard to information detected the multiple sensor unit configured to detect information on a front, a left, and a right of the vehicle, when the gear position indicates going forward.

5. The sensor controller according to claim 1, wherein, the traveling state grasping unit specifies a gear position of the vehicle, and the processing portion changing unit expands the predetermined area, with regard to information detected by the multiple sensor unit configured to detect the information on a rear, a left, and a right of the vehicle, when the gear position indicates going backward.

6. The sensor controller according to claim 1, wherein,
the traveling state grasping unit specifies a traveling direction of the vehicle entering an intersection, and
the processing portion changing unit expands the predetermined area in accordance with the traveling direction.

7. The sensor controller according to claim 1, wherein,
the traveling state grasping unit specifies a traveling direction of the vehicle entering an intersection, and
the processing portion changing unit expands the predetermined area, with regard to information detected by the multiple sensor unit configured to detect the information on a rear of and on a left of the vehicle, when the traveling direction is left.

8. The sensor controller according to claim 1, wherein,
the traveling state grasping unit specifies a traveling direction of the vehicle entering an intersection, and
the processing portion changing unit expands the predetermined area, with regard to information detected by the multiple sensor unit configured to detect the information on a rear of and on a right of the vehicle, when the traveling direction is right.

9. The sensor controller according to claim 1, wherein,
the traveling state grasping unit specifies a road type of the road where the vehicle is traveling, and
the processing portion changing unit selects a sensor, out of the multiple sensors of the multiple sensor unit, to be activated in accordance with the road type.

10. The sensor controller according to claim 1, wherein,
the traveling state grasping unit specifies a road type of the road where the vehicle is traveling, and existence of an oncoming vehicle, and
the processing portion changing unit selects a sensor to be activated, out of the multiple sensors of the multiple sensor unit, for detecting the information on a left side and a right side, when the road type is a narrow road and the oncoming vehicle exists.

11. The sensor controller according to claim 1, wherein,
the traveling state grasping unit specifies a road type of a road where the vehicle is traveling, and
the processing portion changing unit expands the predetermined area in accordance with the road type.

12. The sensor controller according to claim 1, wherein,
the traveling state grasping unit specifies a road type of a road where the vehicle is traveling, and existence of an oncoming vehicle, and
the processing portion changing unit expands the predetermined area, with regard to information detected the multiple sensor unit configured to detect the information on a left side and a right side, when the road type is a narrow road and the oncoming vehicle exists.

13. The sensor controller according to claim 1, wherein,
the traveling state grasping unit specifies whether or not the vehicle performs a lane change on a road on which the vehicle is traveling, and
the processing portion changing unit expands the predetermined area when the vehicle performs the lane change, with regard to information detected by the multiple sensor unit configured to detect information in a direction toward which the vehicle changes lanes.

14. The sensor controller according to claim 1, wherein,
the traveling state grasping unit specifies whether or not the vehicle performs a lane change on a road on which the vehicle is traveling, and
the processing portion changing unit activates, out of the multiple sensors of the multiple sensor unit, a sensor configured to detect the information in a direction toward which the vehicle changes lanes.

15. The sensor controller according to claim 13, wherein,
the traveling state grasping unit specifies that when the road on which the vehicle is traveling is provided with a lane exclusive to the traveling direction and the vehicle is not traveling in the exclusive lane, the lane change is performed toward the exclusive lane.

16. The sensor controller according to claim 1, wherein,
the traveling state grasping unit specifies existence of a road divider of a road on which the vehicle is traveling, and whether or not the vehicle is traveling in a lane adjacent to the road divider, and
the processing portion changing unit reduces the predetermined area, with regard to information detected by the multiple sensor unit configured to detect the information on the side where the road divider exists, when the vehicle is traveling in the lane adjacent to the road divider.

17. The sensor controller according to claim 1, wherein,
the processing portion changing unit raises a priority for execution by the processing unit, in accordance with the traveling state grasped by the traveling state grasping unit.

18. The sensor controller according to claim 14, wherein,
the traveling state grasping unit specifies that when the road on which the vehicle is traveling is provided with a lane exclusive to a traveling direction and the vehicle is not traveling in the exclusive lane, the lane change is performed toward the exclusive lane.

19. A navigation device connected to a multiple sensor unit configured to detect information around a vehicle, the navigation device comprising:
a processor; and
a memory storing computer readable instructions that, when executed by the processor, implement:
a traveling state grasping unit configured to grasp a traveling state of the vehicle,
a processing unit configured to perform a certain process on a predetermined area, within the information around the vehicle detected by the multiple sensor unit, and
a processing portion changing unit configured to change the predetermined area to be processed by the processing unit, in accordance with the traveling state grasped by the traveling state grasping unit;
wherein the processing portion changing unit selects one or more sensors to be activated, out of the multiple sensors of the multiple sensor unit, in accordance with the traveling state grasped by the traveling state grasping unit.

20. A sensor control method associated with a sensor controller connected to a multiple sensor unit configured to detect information around a vehicle, wherein,
the sensor controller comprises a processing unit configured to perform a certain process on a predetermined area, within the information around the vehicle detected by the multiple sensor unit, and
the sensor control method executes:
a traveling state grasping step for grasping a traveling state of the vehicle, and
a processing portion changing step for changing the predetermined area in accordance with the traveling state grasped by the traveling state grasping step;
wherein the processing portion changing step selects one or more sensors to be activated, out of the multiple sensors of the multiple sensor unit, in accordance with the traveling state grasped by the traveling state grasping step.

* * * * *